(12) United States Patent
Fujimaki

(10) Patent No.: US 6,356,189 B1
(45) Date of Patent: Mar. 12, 2002

(54) LIGHTING CONTROL APPARATUS FOR AUTOMATIC FOLLOWING TRAVEL SYSTEM

(75) Inventor: Tomo Fujimaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,560

(22) Filed: Apr. 7, 2000

(30) Foreign Application Priority Data

Apr. 7, 1999 (JP) .......................................... 11-100651
Apr. 9, 1999 (JP) .......................................... 11-103392

(51) Int. Cl.⁷ ................................................ B60Q 1/34
(52) U.S. Cl. ...................... 340/465; 340/902; 340/539; 340/475; 701/23; 701/26
(58) Field of Search ................................ 340/465, 539, 340/531, 475, 902, 901, 431; 701/23, 26; 180/167

(56) References Cited

U.S. PATENT DOCUMENTS

| | | | | |
|---|---|---|---|---|
| 4,087,784 A | * | 5/1978 | West | 340/436 |
| 5,278,554 A | * | 1/1994 | Marton | 340/910 |
| 5,998,929 A | * | 12/1999 | Bechtel et al. | 315/156 |
| 6,032,097 A | * | 2/2000 | Iihoshi et al. | 340/436 |
| 6,121,896 A | * | 9/2000 | Rahman | 340/902 |

* cited by examiner

Primary Examiner—Jeffery Hofsass
Assistant Examiner—Daniel Previl
(74) Attorney, Agent, or Firm—Carrier Blackman & Associates, P.C.; Joseph P. Carrier; William D. Blackman

(57) ABSTRACT

In the lighting control apparatus, according to the present invention, for an automatic following travel system in which a leading vehicle is operated by an operator, and at least one following vehicle automatically follows the leading vehicle, the leading vehicle comprises a light operating device for turning on or off lights of the leading vehicle, and a transmitter for transmitting information indicating the operation of the light operating device, and the following vehicle comprises a receiver for receiving the information from the transmitter, and a light operating device for producing an operation signal for turning on or off a light of the following vehicle, based on the information received by the receiver.

16 Claims, 27 Drawing Sheets

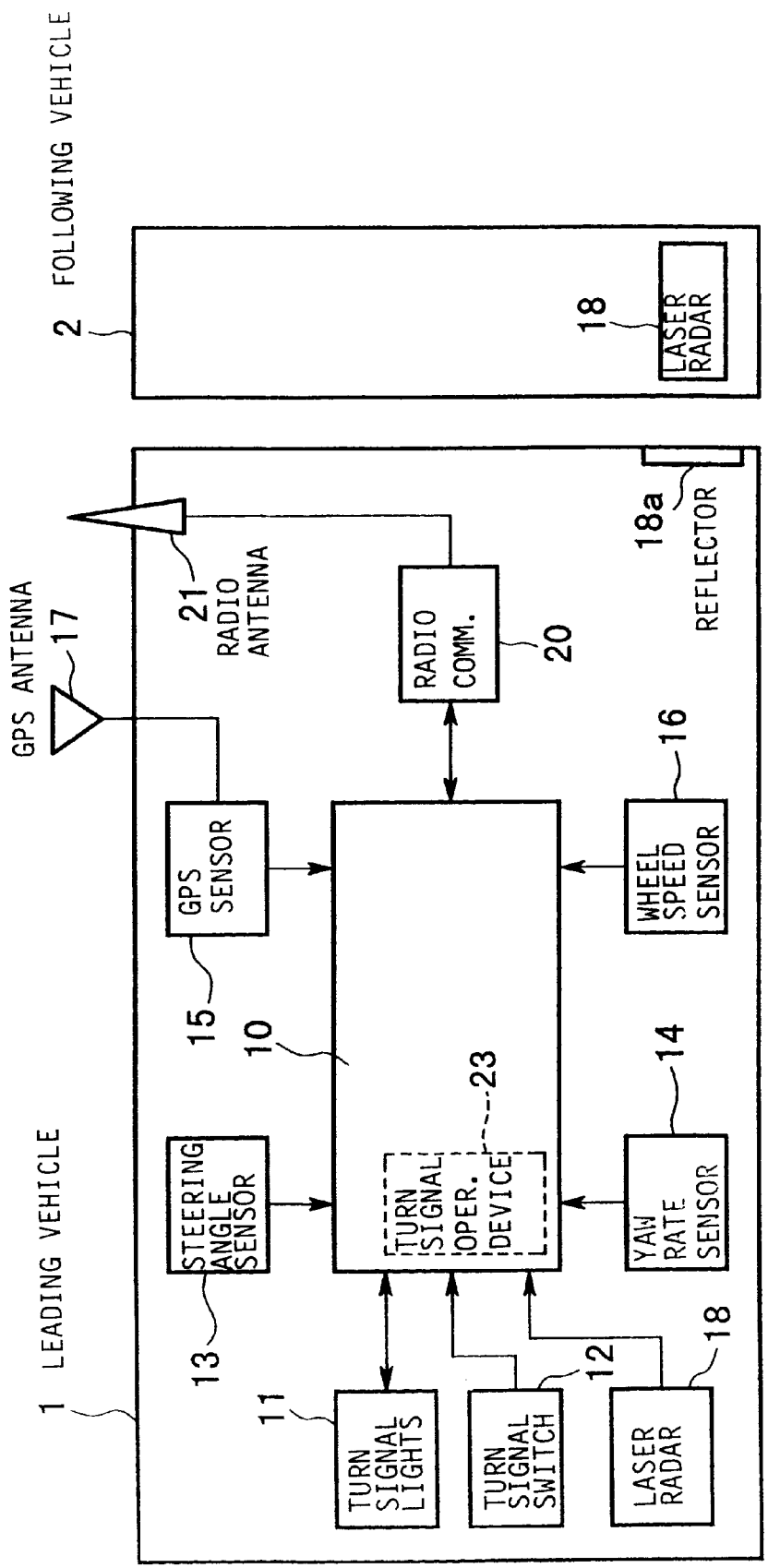

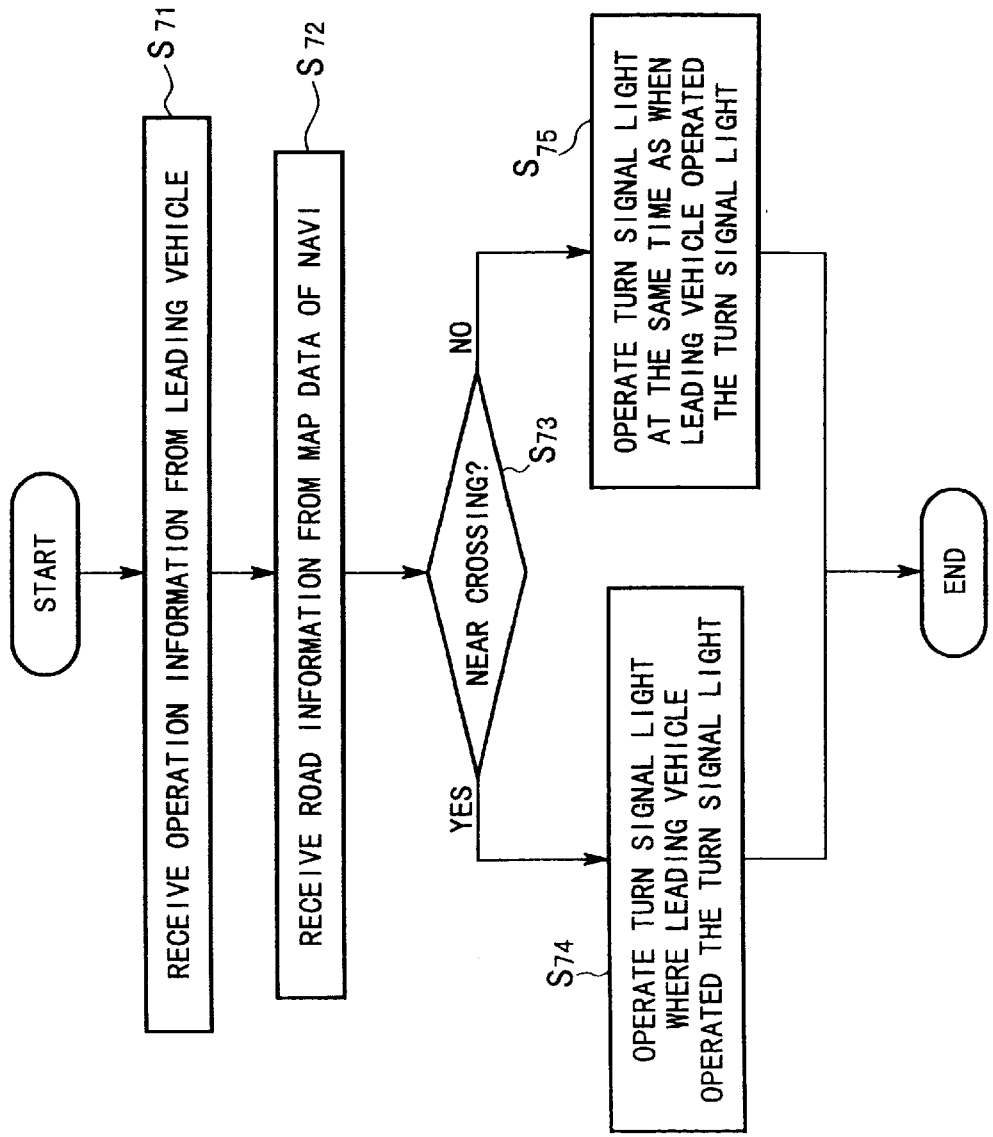

LIGHTING CONTROL APPARATUS FOR AUTOMATIC FOLLOWING TRAVEL SYSTEM

BACKGROUND OF THE INVENTION

1. Field of the Invention

The present invention relates to a lighting control apparatus (for controlling a light such as a turn signal light, headlights, etc.) for an automatic following travel system wherein a leading vehicle is operated by an operator, and vehicles automatically follow the leading vehicle (hereinafter referred to as "following vehicles").

This application is based on Japanese Patent Application Nos. 11-00651, and 11-103392, the contents of which are incorporated herein by reference.

2. Description of the Related Art

Recently, automatic following travel systems have been proposed wherein a leading vehicle is operated by an operator, and following vehicles automatically follow the leading vehicle. These automatic following travel systems reduce labor required to drive the second and succeeding vehicles.

In the conventional automatic following travel system, a driver manually turns on or off turning signal lights by himself to turn right or left at a crossing, or to change traffic lanes.

The conventional automatic following travel system, however, has the following problems.

When turning right or left or changing traffic lanes while one or more vehicles automatically follow a single leading vehicle in such a manner as to form a line, the driver in the leading vehicle turns on the turn signal lights, and the turn signal lights flashes on and off, but the turn signal lights of the unmanned following vehicles are not turned on.

Therefore, pedestrians or drivers in oncoming vehicles cannot know the behavior of the entire line and of the respective individual following vehicles. Further, a driver in a vehicle behind the line cannot anticipate that the last vehicle in the line may start turning right or left or changing traffic lanes.

When it becomes dark, positioning lights for making other persons aware of the positions of the vehicles themselves, and headlights that cast light on the road ahead of the vehicles must be turned on. The operations for turning on or off the positioning lights and the headlights are manually carried out by the driver.

This may be true when turning on or off other lights such as hazard lights for making following vehicles aware of the vehicles stopped due to an emergency, or stop lights for making the following vehicles aware of the braking of the leading vehicle.

The lighting control device of the conventional automatic following travel system has the following problem.

When the vehicles travel in line at night, a driver in the leading vehicle must go to all the following vehicles to turn on the headlights. In particular, this is a burden on the driver when there are a number of the following vehicles. Further, it takes much time to prepare for the travel in line before the starting of the vehicles.

Since the following vehicles are automatically driven in an unmanned manner, the headlights need not be lighted to cast light on the road even at night. However, while the headlights are not lighted, pedestrians or drivers in oncoming vehicles may miss the following vehicles when the vehicles traveling in line turn at a crossing. To avoid this, the headlights of the following vehicles should be always lighted when the vehicles travel in line.

When the vehicles travel close to each other while maintaining a short distances from each other, the respective following vehicles travel after their preceding vehicles normally at the interval of three or four meters, and the headlights simply throw light on the rear of the respective preceding vehicles and do not make pedestrians, etc., aware of the vehicles. That is, it wastes energy to always light the headlights to ensure the visibility when the vehicles turn a crossing, and this waste of energy is serious for the vehicle of the automatic following travel system which uses batteries as the driving sources.

BRIEF SUMMARY OF THE INVENTION

It is therefore an object of the present invention to provide a lighting control system for an automatic following travel system which can turn on or off a light of unmanned following vehicles, corresponding to an on-off action of a light of manned leading vehicle, when the vehicles are traveling in line.

It is therefore another object of the present invention to provide a lighting control system for an automatic following travel system which can appropriately change a timing for turning on the lighting device of the following vehicle or can turn off the light if necessary, and can lengthen the life of the light.

In a first aspect of the present invention, in the lighting control apparatus of present invention for an automatic following travel system in which a leading vehicle (1, 101) is operated by an operator, and at least one following vehicle (2, 102) automatically follows the leading vehicle, the leading vehicle comprises a light operating device (e.g., a turn signal switch 12, or a lighting switch 112) for turning on or off a light (such as turn signal lights, headlights, positioning lights, hazard lights, and stop lights) of the leading vehicle, and a transmitter (radio communicator 20, or 120) for transmitting information indicating the operation of the light operating device, and the following vehicle comprises: a receiver (radio communicator 20, or 120) for receiving the information from the transmitter; and a light operating device (turn signal operating device 23, or lighting operating device 123) for producing an operation signal for turning on or off a light of the following vehicle, based on the information received by the receiver.

When a driver in the leading vehicle turns on the light such as the turn signal light, or headlights, the operation information is sent via the transmitter to the following vehicle. Based on the information received by the receiver, the following vehicle produces the operation signal for turning on the light corresponding to the light of the leading vehicle which has been turned on. Thus, corresponding to the operation by the driver in the leading vehicle, the corresponding light is flashed on and off.

Then, when a driver in the leading vehicle turns off the light, the operation information is sent via the transmitter to the following vehicle. Based on the information received by the receiver, the following vehicle produces the operation signal for turning off the light corresponding to the light of the leading vehicle which has been turned off. Thus, corresponding to the operation by the driver in the leading vehicle, the corresponding light is turned off.

In a second aspect of the present invention, the light is a turn signal light, and the light operating device is a turn signal operating device (23).

When a driver in the leading vehicle turns on the turn signal light, the operation information is sent via the transmitter to the following vehicle. Based on the information received by the receiver, the following vehicle produces the operation signal for turning on the light corresponding to the light of the leading vehicle which has been turned on. Thus, corresponding to the turn signal operation by the driver in the leading vehicle, the turn signal light on the same side is flashed on and off.

Then, when a driver in the leading vehicle turns off the turn signal light, the operation information is sent via the transmitter to the following vehicle. Based on the information received by the receiver, the following vehicle produces the operation signal for turning off the light corresponding to the light of the leading vehicle which has been turned off. Thus, corresponding to the turn signal operation by the driver in the leading vehicle, the turn signal light on the same side is turned off.

According to the invention, the turn signal lights of the following vehicles are turned on or off, corresponding to the on-off action of the turn signal light of the leading vehicle. Therefore, pedestrians or drivers in oncoming vehicles can easily see the movement of the entire line of the vehicles and the respective individual following vehicles. Further, a driver in a vehicle behind the line can anticipate the turning to the right or left of the last vehicle of the line in front, and the change in traffic lane.

In a third aspect of the present invention, the turn signal operating device produces an operation signal for turning off the turn signal light, only when receiving via the receiver information indicating that the turn signal light of the leading vehicle has been turned off and when the following vehicle has finished turning and starts driving straight (steps 19 to 21 in the second embodiment).

After the leading vehicle has finished turning at the crossing and has turned off the turn signal light, even when the following vehicles do not enter the crossing or is turning at the crossing, or when the following vehicles are turning at the crossing, the turn signal light is kept on, and is turned off until the following vehicles have finished turning at the crossing. Therefore, a driver in a vehicle behind the line of the vehicles may not receive appropriate indication of the turning of the vehicles.

In a fourth aspect of the invention, the turn signal operating device produces an operation signal for turning on or off the turn signal light, only when receiving via the receiver information indicating that the turn signal light of the leading vehicle has been turned on or off and when the following vehicle reaches the point where the leading vehicle passed at the time of reception of the information (steps 35, 36, 42, and 43 in the third embodiment)

The following vehicle does not turn on or off the turn signal light when simply receiving via the receiver information indicating that the turn signal light of the leading vehicle has been turned on or off. Then, the following vehicle keeps traveling, and reaches the point where the leading vehicle passed at the time of reception of the information, at which point the turn signal light is turned on or off.

Thus, the following vehicle turns on the turn signal light just when the following vehicle enters the crossing, and turns it off just when the following vehicle finishes turning at the crossing. Therefore, just when the leading vehicle leading a long line of the vehicles enters the crossing and turns on the turn signal light, the following vehicles are prevented from turning on the turn signal too early, since they have not entered the crossing and the crossing is distant.

In a fifth aspect of the invention, the transmitter of the leading vehicle transmits position information indicating where the leading vehicle turns on or off the turn signal light, the receiver of the following vehicle receives the position information, and the turn signal operating device produces an operation signal for turning on or off the turn signal light, only when receiving via the receiver information indicating that the turn signal light of the leading vehicle has been turned on or off and when the following vehicle reaches where the leading vehicle turned on or off the turn signal light (steps in the fourth embodiment).

In a manner similar to the fourth aspect of the invention, the following vehicle does not turn on or off the turn signal light when simply receiving via the receiver information indicating that the turn signal light of the leading vehicle has been turned on or off. Then, the following vehicle keeps traveling, and reaches the point where the leading vehicle passed at the time of reception of the information, at which point the turn signal light is turned on or off.

While in the invention of the fourth aspect the following vehicle calculates the point where the leading vehicle has turned on or off the turn signal light, in the invention of the fifth aspect the leading vehicle transmits the information of the position of the leading vehicle together with the turn signal operation information. Therefore, the following vehicle does not have to calculate the point where the leading vehicle has turned on or off the turn signal, thereby simplifying the control process.

In a sixth aspect of the invention, in the lighting control apparatus for an automatic following travel system in which a leading vehicle is operated by an operator, and at least one following vehicle automatically follows the leading vehicle, the following vehicle comprises: a sensor (a laser radar 118 in the sixth embodiment, an angle difference sensor 141 in the seventh embodiment, or other sensors) for calculating information indicating the relationship between the positions of the following vehicle and a vehicle in front which is the leading vehicle or another following vehicle; and a light operating device (a first headlight operating device 133 in the sixth embodiment, a second headlight operating device 142 in the seventh embodiment, or devices for operating other lights) for turning on a light (headlights 131 in the sixth embodiment, turn signal lights, positioning lights, hazard lights, or stop lights) when the value measured by the sensor exceeds a first predetermined value (upper threshold values in the sixth and seventh embodiment) while a light switch (a headlight switch 132 in the sixth embodiment, or switches for operating other lights) has been turned on, and for turning off the light when the value measured by the sensor is equal to or below a second predetermined value (lower threshold values in the sixth and seventh embodiment) even while the light switch has been turned on.

When the vehicles are traveling in line, the lighting control apparatus which can turn on or off the light of unmanned following vehicles, corresponding to the on-off action of the light of manned leading vehicle. The driver in the leading vehicle does not have to go to the respective following vehicles to turn on or off the light, reducing labor of the driver who operates the light. Further, the driver does not have to directly turn on or off the light of the following vehicles, thereby shortening a time required to start travel in line at night, and also shortening a time required to terminate the travel in line.

In a seventh aspect of the present invention, the light in the sixth aspect is a headlight, and the light operating device in the sixth aspect is a headlight operating device (a first headlight operating device 133).

In an eighth aspect of the present invention, the sensor in the seventh aspect is a distance sensor (laser radar 118 in the sixth embodiment) for measuring the distance between the following vehicle and the vehicle in front.

While the lighting switch has been turned on, when the value measured by the distance sensor, that is, the distance between the following vehicle and the leading vehicle exceeds the predetermined value, the headlight operating device turns on the headlights.

Even while the headlight switch has been turned on, when the value measured by the distance sensor is equal to or below the predetermined value, the headlights are turned off.

That is, when the vehicles travel in line, the headlights of the unmanned following vehicles are automatically turned on or off, depending on the distances between the following vehicles and the leading vehicle. Because the headlights are turned on, depending on the circumstances, the batteries are prevented from being wasted.

In a ninth aspect of the present invention, the sensor in the sixth aspect is an angle difference sensor (angle difference sensor 41 in the seventh embodiment) for measuring the difference in angle between the following vehicle and the vehicle in front.

While the lighting switch has been turned on, when the value measured by the angle difference sensor, that is, the difference in angle between the following vehicle and the leading vehicle exceeds the predetermined value, the headlight operating device turns on the headlights.

Even while the headlight switch has been turned on, when the value measured by the angle difference sensor is equal to or below the predetermined value, the headlights are turned off.

That is, when the vehicles travel in line, the headlights of the unmanned following vehicles are automatically turned on or off, depending on the differences in angle between the following vehicles and the leading vehicle. Therefore, the batteries are prevented from being wasted.

In a tenth aspect of the present invention, the sensor in the sixth aspect is a lateral deviation sensor for measuring the lateral deviation between the following vehicle and the vehicle in front.

When the value measured by the lateral deviation sensor, that is, the lateral deviation of the following vehicle with respect to the leading vehicle exceeds the predetermined value, the headlight operating device turns on the headlights. When the lateral deviation is equal to or below the predetermined value, the headlights are turned off.

That is, when the vehicles travel in line, the headlights of the unmanned following vehicles are automatically turned on or off, depending on the lateral deviation of the following vehicles with respect to the leading vehicle. Therefore, the batteries are prevented from being wasted.

In an eleventh aspect of the present invention, in the lighting control apparatus for an automatic following travel system, the following vehicle comprises a determining device (steps 152 and 154 in the eighth embodiment) for determining whether the light is to be turned on or off, based on information concerning the condition of the leading vehicle transmitted via inter-vehicle communication. When the determining device determines that the light is to be turned on while a light switch has been turned on, the light is turned on. When the determining device determines that the light is to be turned off even while the light switch has been turned on, the light is turned off.

In this invention of the eleventh aspect, the determining device of the following vehicle determines whether the light is to be turned on or off, based on the condition of the leading vehicle.

When the leading vehicle is turning right or left at a crossing, the following vehicles turn on their headlights before turning right or left, or just when the leading starts turning right or left. Pedestrians and drivers in oncoming vehicles can find the line of the vehicles in the crossing at the appropriate timing.

In a twelfth aspect of the present invention, the following vehicle further comprises an on-state maintaining device (steps 161 to 167 in the ninth embodiment) for keeping the light on after the turning on of the light until a predetermined time has passed or until the following vehicle travels a predetermined distance.

The on-state maintaining device keeps the light on until a predetermined time has passed or until the following vehicle travels a predetermined distance. Even when the signal for tuning on or off the light is received, the light is not turned on or off, and is kept on. Thus, the frequency of turning on or off the light is reduced, and the lives of the lights can be lengthened.

BRIEF DESCRIPTION OF THE DRAWINGS

FIG. 2 is a block diagram showing the turn signal control apparatus in the automatic following travel system of the first embodiment.

FIG. 12 is a flowchart showing a modification of the present invention.

DETAILED DESCRIPTION OF THE INVENTION

[First Embodiment]

Figure 1A:
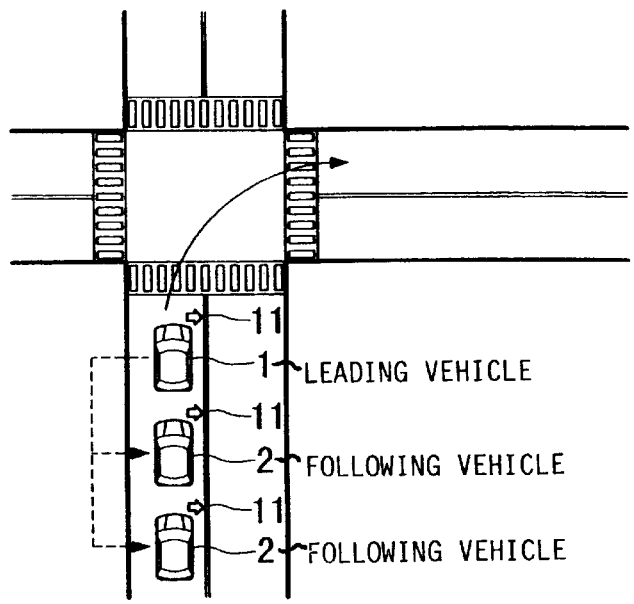
FIGS. 1A and 1B are top views schematically showing the progress of tracking of vehicles using the turn signal control apparatus for the automatic following travel system of the first embodiment of the present invention.
Figure 1B:
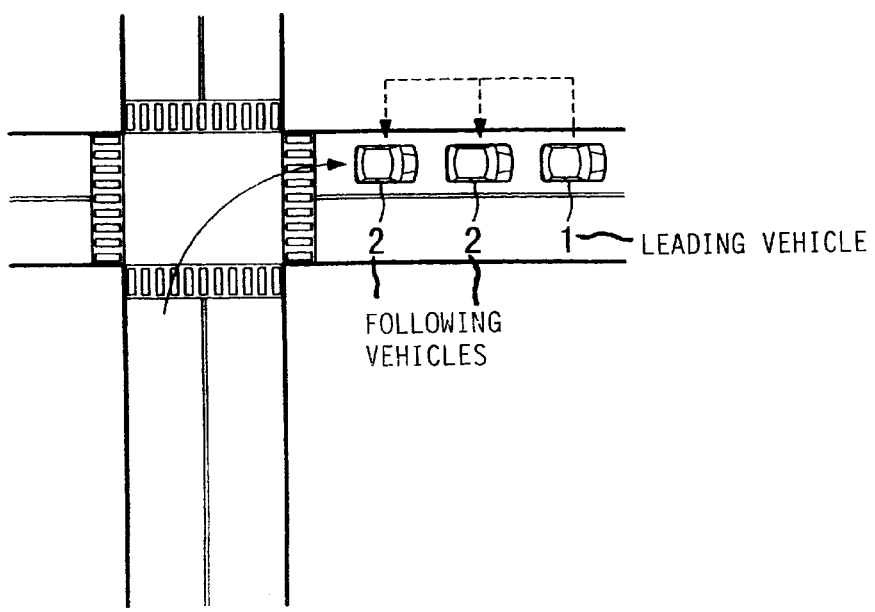

FIGS. 1A and 1B show electric vehicles which travel in line. The electric vehicles consist of a leading vehicle 1 driven by a driver, and following vehicles 2. While the following vehicle 2 may be single or plural, this embodiment includes two following vehicles.

Figure 3:
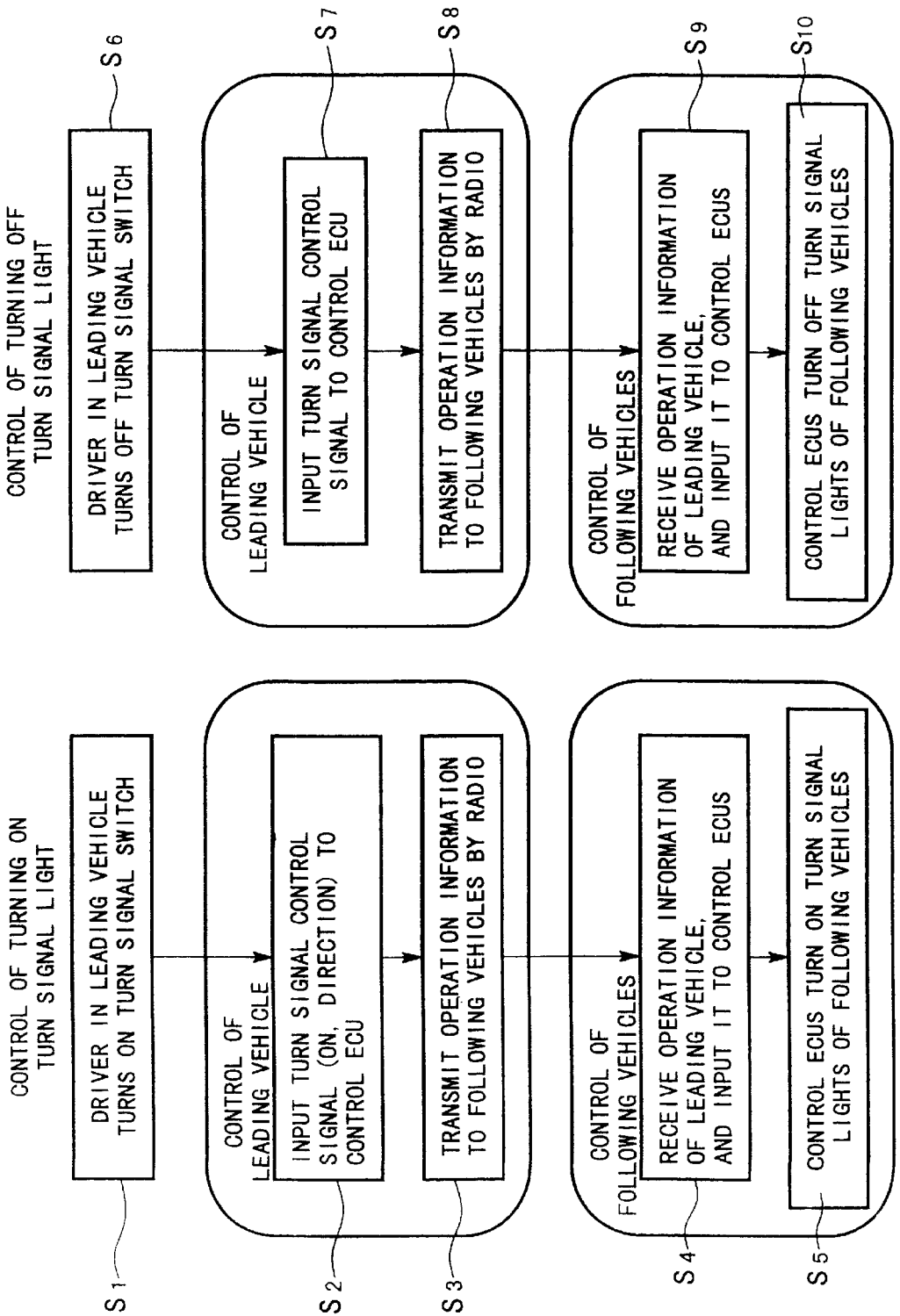
FIG. 3 is a flowchart showing the process of the turn signal control apparatus in the automatic following travel system of the first embodiment.

In FIG. 3, the leading vehicle 1 and the following vehicles 2 are electric vehicles each of which uses an electric motor as its driving source, conducts manned or unmanned travel, and is driven by supplying electric power from a battery to a motor controlled by a control ECU (Electronic Control Unit) for controlling the driving force and by rotating wheels by the motor.

Each of the electric vehicles of the leading vehicle 1 and the following vehicles 2 has a control ECU 10 for performing all driving control, in addition to the control ECU for controlling the driving force. Irrespective of status as the leading vehicle or the following vehicles, all the vehicles have both functions of the leading vehicle and the following vehicle. Therefore, the control ECU 10 includes both control functions for acting as the leading vehicle and for acting as the following vehicle. As will be understood, the transmitters and receivers of the leading and following vehicles function under all automatic following traveling conditions of the vehicles, as necessary for automatic control.

As shown in FIG. 2, the control ECU 10 includes turn signal lights 11, a switch for flashing on and off the turn signal lights 11, a steering angle sensor 13 for detecting a steering angle which represents an operational amount of a steering, a yaw rate sensor 14 for detecting an angular velocity of the vehicle in the transverse direction (steering direction), a GPS sensor 15 for measuring the present position (latitude/longitude) of the vehicle, and a wheel speed sensor 16 for detecting the wheel speed of the vehicle.

A GPS antenna 17 for receiving radio waves from a GPS satellite is connected to the GPS sensor 15. The yaw rate sensor 14, and the wheel speed sensor 16 are used to control the automatic following travel of the following vehicle 2.

Because the accuracy of the GPS sensor 15 in detecting a position is low, e.g., approximately 1 meter, the GPS sensor 15 is not used for the driving control (feed-back control, and feed forward control) when the vehicles travel in line. The GPS sensor 15 is used, e.g., to allow a control center to confirm the position of the line, and to indicate the vehicle position on a map on a display of a navigation system having a voice guide speaker.

The GPS sensor 15 may be used to detect that the following vehicle 2 reaches a predetermined point where the leading vehicle passed. This function can be achieved by integrating values detected by the vehicle speed sensor 16.

The position and direction of each of the vehicles traveling in line, which are required for the driving control, are measured by a relative position sensor 18 such as a laser radar mounted on each of the following vehicles 2. When the laser radar is employed, the laser radar 18 emits the laser light toward a reflector 18a attached to the rear of the leading vehicle 1 or the following vehicle 2, and based on the reflected light, the distance and the direction (angle) from the vehicle to the vehicle in front can be measured.

A radio communicator 20 is connected to the control ECU 10, and sends the information concerning the operation of the turn signal lights (the on-off action information of the right and left turn signal lights, and/or the position information of the leading vehicle 1 at that time of the operation) from the leading vehicle 1 through the radio antenna 21 to the following vehicle 2.

The radio communicator 20 is used when sending control data required for the automatic travel in line (such as the vehicle position (x, y) and the direction θ, and the amount of operation of the accelerator, the brake, and the steering), in addition to the information concerning the turn signal operation, from leading vehicle 1 to the following vehicle 2, and when reporting the driving condition from the following vehicle 2 to the leading vehicle 1.

The control ECU 10 includes a turn signal operating device 23 which is utilized when the vehicle acts as the following vehicle 2. The turn signal operating device 23 receives the information concerning the turn signal operation of the leading vehicle 1 via the radio communicator 20, and based on this information, sends an operation signal to turn on or off the turn signal light 11 on the same side (right or left side) as that of the leading vehicle 1 which has been turned on.

The control ECU 10 sends the control signals to a driving motor, an electrically-operated power steering, and an electrically-operated brake device (not shown) to travel in line.

Specifically, in the leading vehicle 1, the driving motor, the electrically-operated power steering, and the electrically-operated brake are controlled by the control signals from the control ECU, depending on the amount of operation of the accelerator, the brake, and the steering. The position of the leading vehicle 1 is detected by the yaw rate sensor 14, the GPS sensor 15, and the wheel speed sensor 16.

The information of the amount of operation of the accelerator, the brake, and the steering, and the position of the leading vehicle is transmitted through the radio communicator 20 to the respective following vehicles 2.

In the following vehicle 2, the driving motor, the electrically-operated power steering, and the electrically-operated brake are controlled by the control signals from the control ECU 10, depending on the amount of operation of the accelerator, the brake, and the steering, and on the position information of the vehicle and the vehicle in front of that vehicle detected by the laser radar 18 which is the relative position sensor.

The turn signal operating device will be discussed in detail later in the description of the operation.

The operation of the turn signal control apparatus in the automatic following system will now be explained.

As shown in FIG. 1, the description will be made by way of the case in which the vehicles which travel in line turn right in a crossing. Before the crossing, the driver in the leading vehicle 1 turns on the turn signal switch 12 (step S1 in FIG. 3). The switch 12 sends a turn signal ON signal (R), and this signal is input to the control ECU 10 (step S2). The control ECU 10 sends a signal to turn on the turn signal light 11, and the right turn signal light 11 flashes on and off.

When the control ECU 10 detects the ON signal and sends the signal to turn on the turn signal light 11, the control ECU 10 also produce turn signal operation information (R), and transmits this information from the radio communicator 20 and the radio antenna 21 to the following vehicles 2 (step S3).

The turn signal operation information may be transmitted together with the control data required for the automatic travel in line, and may be transmitted separately.

The following vehicle 2 receives the turn signal operation information from the leading vehicle 1 via the radio antenna 21 and the radio communicator 20, and inputs it to the control ECU 10 (step S4). When the control ECU 10 receives this information, the turn signal operating device 23 outputs a signal (R) to turn on the turn signal light (step S5), and thus the right turn signal light 11 is flashed on and off.

When the leading vehicle finishes turning right, the driver in the leading vehicle 1 turns off the turn signal switch 12 for the headlights (step S6). Instead of the manual operation of the driver, the switch may be turned off by auto-cancellation which includes detecting by the steering angle sensor that the steering has returned to the neutral position, and automatically turning off the turn signal switch.

Then, the switch 12 inputs a turn signal OFF signal (R) to the control ECU 10 (step S7). Then, the control ECU 10 sends a signal to turn off the turn signal light 11, and the right turn signal lights of the leading vehicle 1 are turned off.

When the control ECU 10 sends the signal to turn off the turn signal light, the control ECU 10 also produces turn signal OFF operation information, and this OFF operation information is transmitted from the radio communicator 20 and the radio antenna 21 to the following vehicles 2 (step S8).

The following vehicle 2 receives the OFF action information via the radio antenna 21 and the radio communicator 20, and inputs it to the control ECU 10 (step S9). When the control ECU 10 receives the OFF action information of the turn signal light, the turn signal operating device 23 outputs an OFF signal (R) to the right turn signal light 11, and thus the right turn signal light 11 of the following vehicle 2 is turned off (step S10).

According to the turn signal control apparatus, the turn signal lights 11 of the following vehicles 2 are turned on or off, corresponding to the on-off action of the turn signal light 11 of the leading vehicle 1. Therefore, pedestrians or drivers in oncoming vehicles can easily see the movement of the entire line of the vehicles and the respective following vehicles.

Further, a driver in a vehicle behind the line can anticipate the turning to the right or left of the last vehicle of the line in front, and the change in traffic lane.

[Second Embodiment]

The first embodiment operates the turn signal lights 11 of the following vehicles 2 at the same time as when the leading vehicle 1 operates the turn signal light 11. Therefore, the turning may not be indicated at an appropriate position.

For example, after the leading vehicle 1 has finished turning at the crossing and has turned off the turn signal light 11 (including the auto-cancellation), even when the following vehicles 2 have not entered the crossing or is turning at the crossing, the turn signal lights of the following vehicles 2 may be turned off before the crossing.

Therefore, a driver in a vehicle behind the line of the vehicles may not receive appropriate indication of the turning of the vehicles.

The second embodiment includes a turn signal operating device 23 for sending an operation signal to turn off the turn signal light at a specified timing.

That is, the turn signal operating device 23 of the following vehicle of the second embodiment produces the operation signal to turn off the turn signal light 11 only when receiving from the radio communicator 20 the information indicating that the turn signal lights of the leading vehicle has been turned off, and when the following vehicle has finished turning and starts traveling straight.

Specifically, only when two conditions are met, is the completion of the turning determined, and the operation signal to turn off the turn signal lights 11 of the following vehicles 2 sent: when the steering angle sensor 13 for detecting the angle of the steering detects that, after the steering was rotated right or left, the steering has returned to the neutral position, or it is determined based on the output from the yaw rate sensor 14 that the following vehicle 2 has finished turning and starts running straight, and when receiving from the radio communicator 20 the information indicating that the turn signal lights of the leading vehicle has been turned off.

Because the outline of the control block is similar to that of the first embodiment shown in FIG. 2, the descriptions of the parts other than turn signal operating device 23 are omitted.

The operation of the turn signal control apparatus in the automatic following system of the second embodiment will now be explained with reference to FIGS. 4 and 5.

Figure 4A:
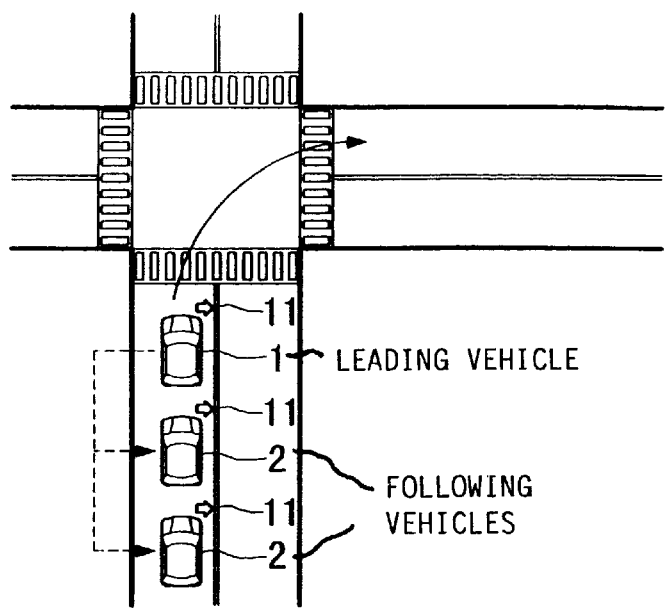
FIGS. 4A to 4C are top views schematically showing the progress of tracking of vehicles using the turn signal control apparatus in the automatic following travel system of the second embodiment of the present invention.
Figure 4B:
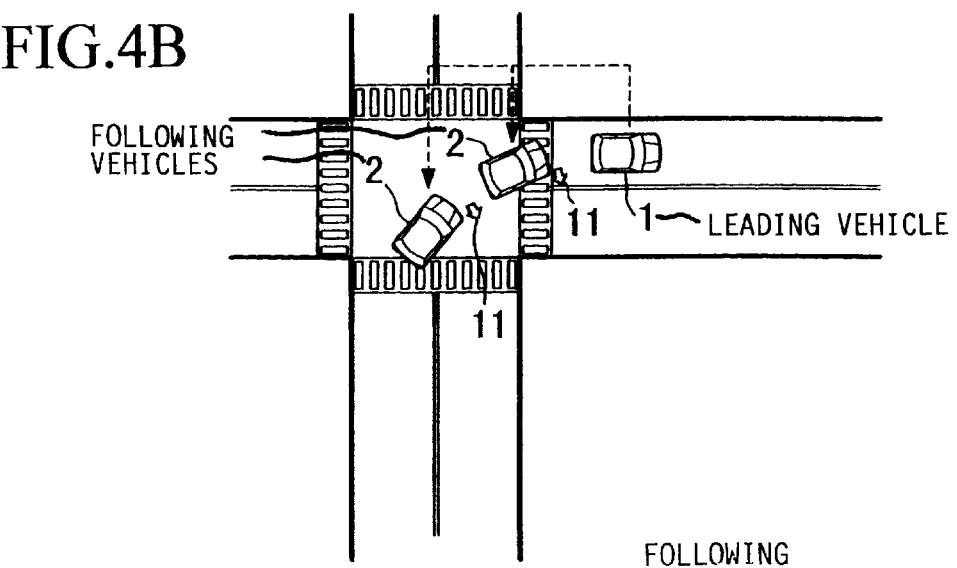
Figure 4C:
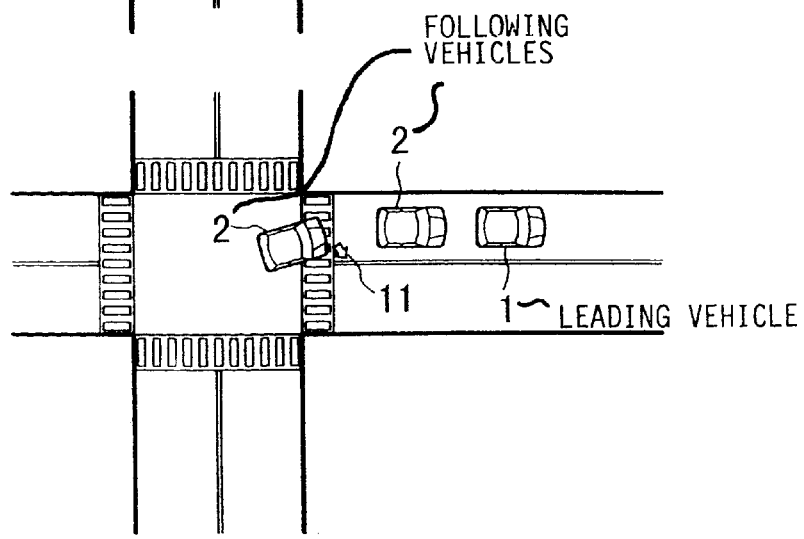
Figure 5:
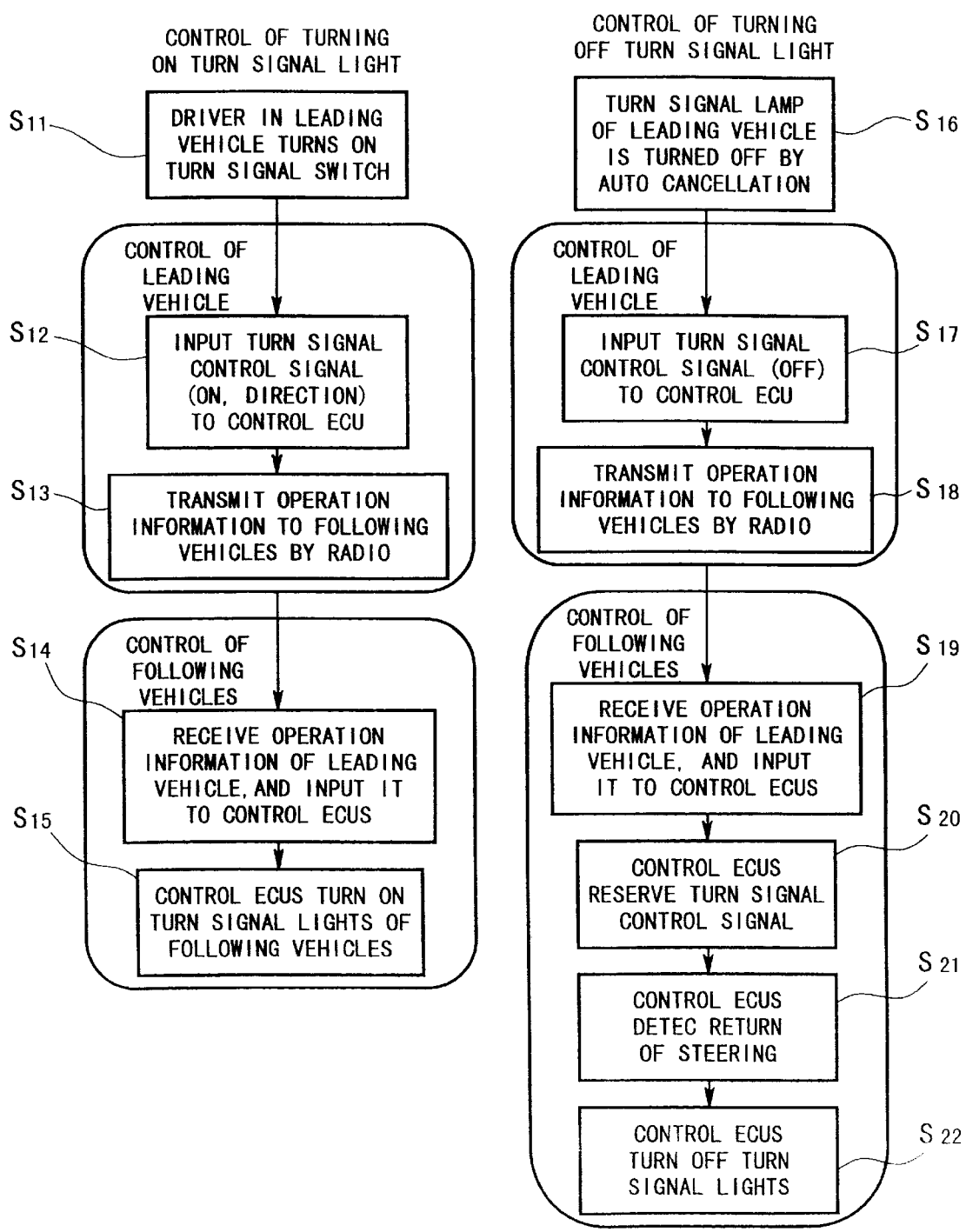
FIG. 5 is a flowchart showing the process of the turn signal control apparatus in the automatic following travel system of the second embodiment.

As shown in FIG. 4, the description will be made by way of the case in which the vehicles which travel in line turn right in a crossing. Before the crossing, the driver in the leading vehicle 1 turns on the turn signal switch 12 (step S11). The switch 12 sends a turn signal ON signal (R), and this signal is input to the control ECU 10 (step S12). The control ECU 10 sends a signal to turn on the turn signal light 11, and the right turn signal light 11 of the leading vehicle 1 flashes on and off. When the control ECU 10 detects the ON signal and sends the signal to turn on the turn signal light 11, the control ECU 10 also produce turn signal operation information (R), and transmits this information from the radio communicator 20 and the radio antenna 21 to the following vehicles 2 (step S13).

The following vehicle 2 receives the turn signal operation information from the leading vehicle 1 via the radio antenna 21 and the radio communicator 20, and inputs it to the control ECU 10 (step S14). When the control ECU 10 receives this information, the turn signal operating device 23 outputs a signal (R) to turn on the turn signal light (step S15), and thus the right turn signal light 11 is flashed on and off.

This operation for turning on the turn signal light is similar to that of the first embodiment.

When the leading vehicle 1 finishes turning right, the driver in the leading vehicle 1 turns off the turn signal switch 12 by, e.g., the auto-cancellation (step S16). Then, the switch 12 inputs a turn signal OFF signal (R) to the control ECU 10 (step S17). The control ECU 10 sends a signal to turn off the turn signal light 11, and the right turn signal light of the leading vehicle 1 is turned off.

When the control ECU 10 detects the OFF signal, the control ECU 10 also produces turn signal OFF action information (R), and this OFF action information is transmitted from the radio communicator 20 and the radio antenna 21 to the following vehicles 2 (step S18).

The following vehicle 2 receives the turn signal OFF action information via the radio antenna 21 and the radio communicator 20, and inputs it to the control ECU 10 (step S19). When the control ECU 10 of the following vehicle 2 simply receives the turn signal OFF action information, the following vehicle 2 reserves the information without producing the turn signal OFF signal (step S20). Only when two conditions are met: that is, when receiving the turn signal OFF action information from the leading vehicle 1, and when the steering of the following vehicle 2 has returned to the neutral position, the operation signal to turn off the turn signal light 11 is output, and the right turn signal light 11 is turned off (step S22).

Instead of determining that the steering of the following vehicle 2 has returned to the neutral position, it may be determined, based on the output from the yaw rate sensor 14, whether the following vehicle 2 has finished turning and starts running straight or not.

Thus, the following vehicles 2 turn on the turn signal lights at the same time as when the leading vehicle 1 turns it on, do not turn off the turn signal lights at the same time as when the leading vehicle 1 turns it off, and turns them off when the following vehicles has finished turning at the crossing.

[Third Embodiment]

The first and second embodiment turn on the turn signal lights of the following vehicles 2 at the same time as when the leading vehicle 1 turns it on. Therefore, the turning may not be indicated at an appropriate position.

For example, when the leading vehicle 1 leading the long line of the vehicles enters the crossing and turns on the turn signal light, the following vehicles toward the end may turn on the turn signal too early since the crossing is distant.

Therefore, a driver in a vehicle behind the line of the vehicles may not receive appropriate indication of the turning of the vehicles.

The third embodiment includes a turn signal operating device 23 for sending an operation signal to turn on the turn signal light at a specified timing.

That is, the turn signal operating device 23 of the following vehicle of the third embodiment produces the operation signal to operate the turn signal light 11 only when receiving from the radio communicator 20 the information indicating that the turn signal lights of the leading vehicle has been operated, and when the following vehicle has passed the position of the leading vehicle 1 at the time of receiving the information. This operation can be applied to both the ON- and OFF-actions.

Specifically, the following vehicles 2 traveling in line basically store the track data of the leading vehicle 1, and trace the track to conduct the following travel. When receiving the information indicating that the turn signal light of the leading vehicle 1 has been turned on, each of the following vehicles 2 determines, from the stored track of the leading vehicle 1, where the leading vehicle 1 has turned on the turn signal light. When the following vehicle 2 passes that point, it produces the operation signal for operating the turn signal light 11.

Because the outline of the control block of this embodiment is similar to that of the first embodiment shown in FIG. 2, the descriptions of the parts other than turn signal operating device 23 are omitted.

The operation of the turn signal control apparatus in the automatic following system of the third embodiment will now be explained with reference to FIGS. 6 to 8.

Figure 6A:
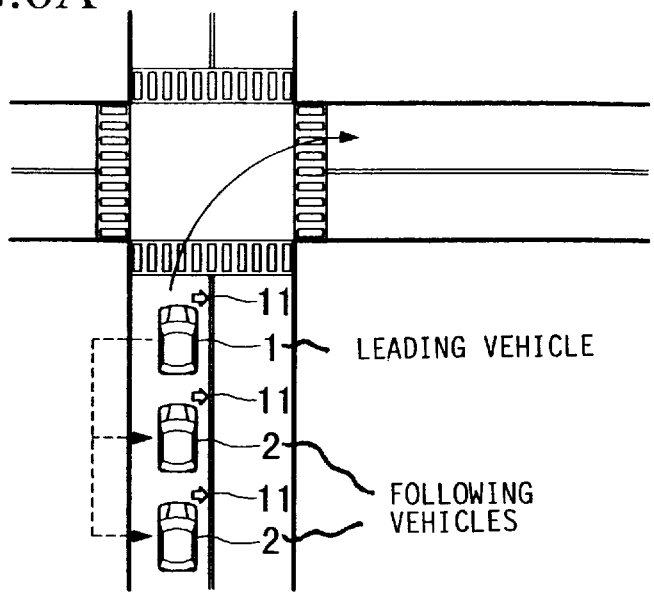
FIGS. 6A to 6C are top views schematically showing the progress of tracking of vehicles using the turn signal control apparatus for the automatic following travel system of the third embodiment of the present invention.
Figure 6B:
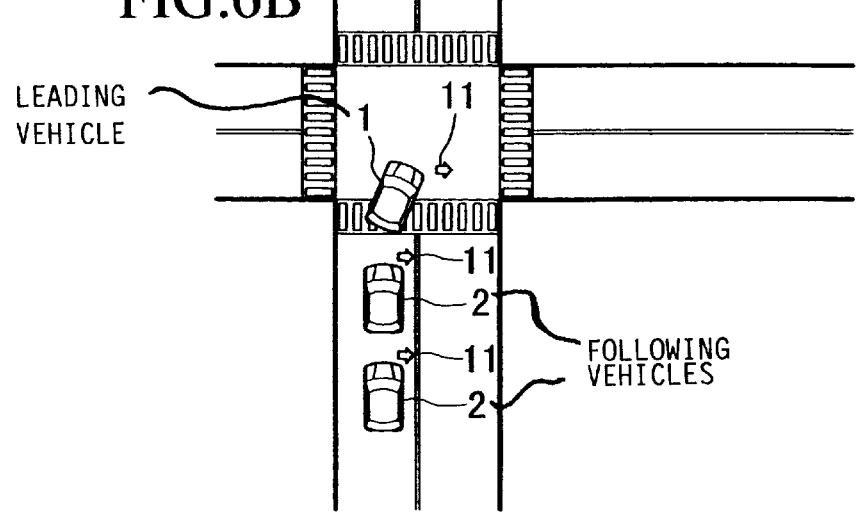
Figure 6C:
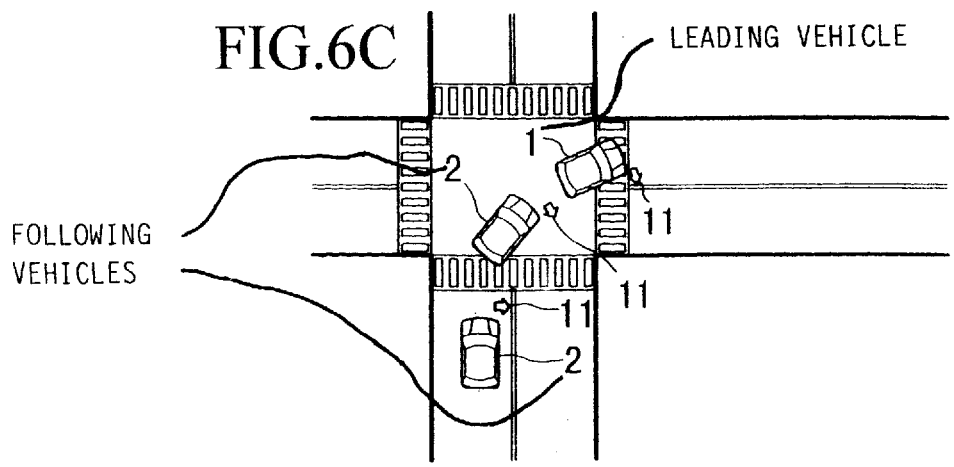
Figure 7D:
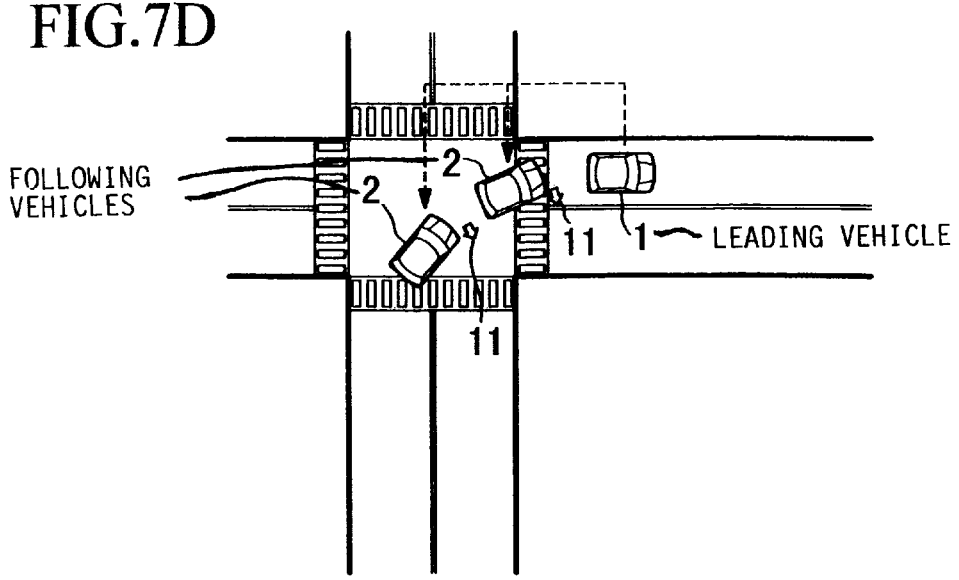
FIGS. 7D to 7F are top views schematically showing the progress of tracking of vehicles using the turn signal control apparatus for the automatic following travel system of the third embodiment of the present invention.
Figure 7E:
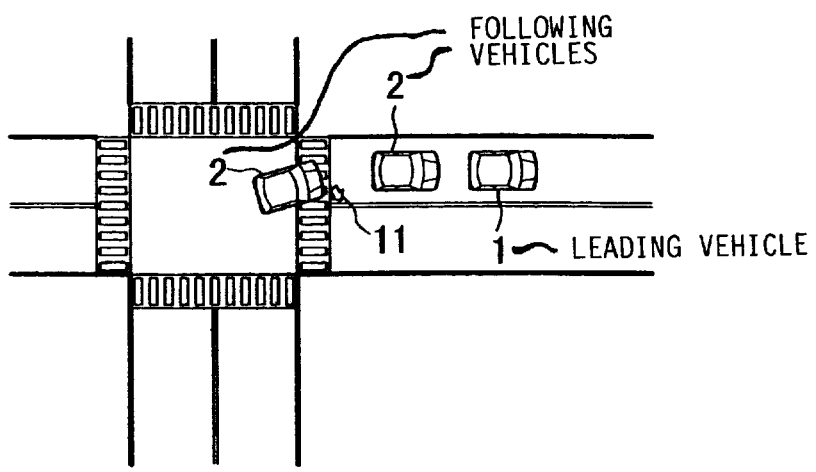
Figure 7F:
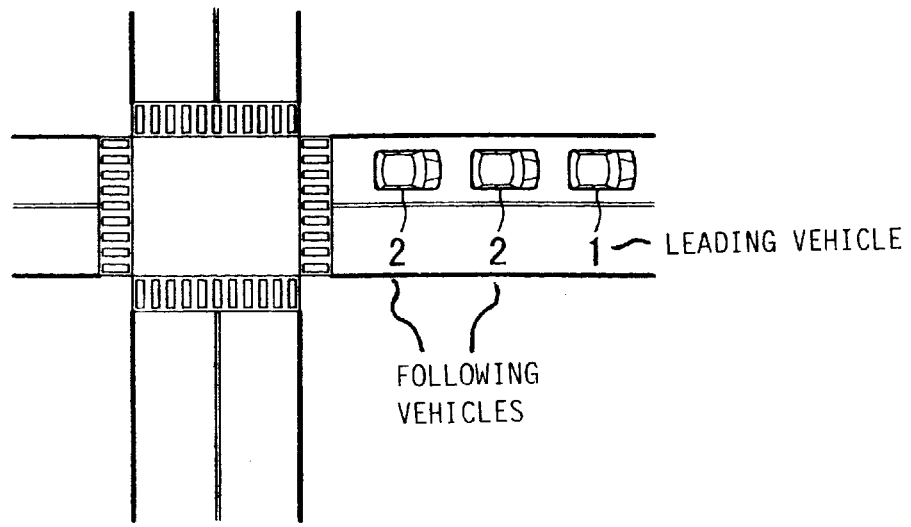
Figure 8:
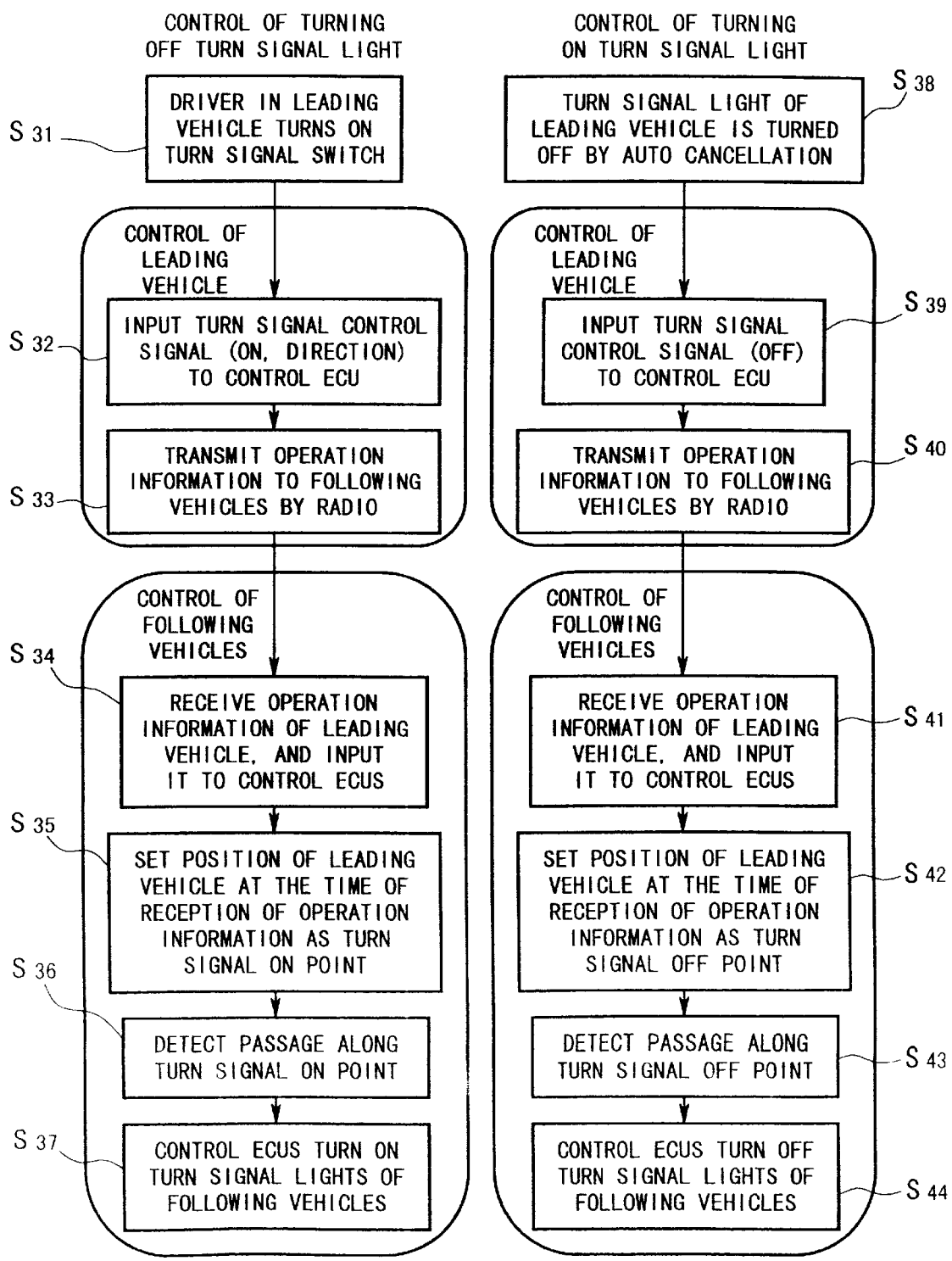
FIG. 8 is a flowchart showing the process of the turn signal control apparatus in the automatic following travel system of the third embodiment.

As shown in FIGS. 6 and 7, the description will be made by way of the case in which the vehicles which travel in line turn right in a crossing. The driver in the leading vehicle 1 turns on the turn signal switch 12 (step S31). The switch 12 sends a turn signal ON signal (R), and this signal is input to the control ECU 10 (step S32). The control ECU 10 sends a signal to turn on the turn signal light 11, and the right turn signal light 11 of the leading vehicle 1 flashes on and off. When the control ECU 10 detects the ON signal and sends the signal to turn on the turn signal light 11, the control ECU 10 also produce turn signal ON operation information (R), and transmits this information from the radio communicator 20 and the radio antenna 21 to the following vehicles 2 (step S33).

The following vehicle 2 receives the turn signal ON operation information from the leading vehicle 1 via the radio antenna 21 and the radio communicator 20, and inputs it to the control ECU 10 (step S34). When receiving this information, the control ECU 10 stores, based on the track data of the leading vehicle 1 transmitted via the inter-vehicle communication, where the leading vehicle has turned on the turn signal light (step S35). Thereafter, when the following vehicle 2 passes that point, the position sensor incorporated in the following vehicle 2 (such as the GPS sensor 15, the vehicle speed sensor 16, the relative position sensor 18 such as the laser radar, or a gyro sensor) detects the passage (step S36), the operation signal for turning on the turn signal light 11 is produced based on the detection signal (step S37), and the right turn signal light 11 is flashed on and off.

When the leading vehicle finishes turning right, the driver in the leading vehicle 1 turns off the turn signal switch 12 by, e.g., the auto-cancellation (step S38). Then, the switch 12 inputs a turn signal OFF signal (R) to the control ECU 10

(step S39). The control ECU 10 sends a signal to turn off the turn signal light 11, and the right turn signal light of the leading vehicle 1 is turned off.

When the control ECU 10 detects the OFF signal, the control ECU 10 also produces turn signal OFF action information (R), and this OFF action information is transmitted from the radio communicator 20 and the radio antenna 21 to the following vehicles 2 (step S40).

The following vehicle 2 receives the turn signal OFF action information via the radio communicator 20, and inputs it to the control ECU 10 (step S41). When receiving the information indicating that the turn signal light of the leading vehicle 1 has been turned off, the control ECU 10 stores, based on the stored track data of the leading vehicle 1, where the leading vehicle has turned off the turn signal light (step S42). Thereafter, when the following vehicle 2 passes that point, the internal position sensor detects the passage (step S43), the operation signal for turning off the turn signal light 11 is produced based on the detection signal, and the right turn signal light 11 is turned off (step S44).

Thus, the following vehicles 2 turn on the turn signal lights when the following vehicles themselves enter the crossing, and turn them off when the following vehicles themselves finish turning the crossing.

[Fourth Embodiment]

In the third embodiment, the turn signal operating device 23 of the following vehicle 2 stores the point (location) of the leading vehicle 1 when receiving via the radio communicator 20 the information indicating that the turn signal light has been operated, and the operation signal for operating the turn signal light is sent when the following vehicle 2 passes this point. The fourth embodiment inserts position information as to where the leading vehicle 1 has operated the turn signal light into the information to be transmitted from the leading vehicle 1 to the following vehicle 2. Accordingly, the turn signal operating device 23 of the following vehicle 2 sends the operation signal to the turn signal light only when the receiver (radio communicator 20) receives the information indicating that the turn signal light of the leading vehicle 1 has been operated, and when the following vehicle 2 passes the point specified by the transmitted information.

The position information is the track data of the leading vehicle (concerning the driving distance, and coordinates), or the data measured by the GPS sensor 15.

Because the outline of the control block of this embodiment is similar to that of the first embodiment shown in FIG. 2, the descriptions of the parts other than the transmitter and the turn signal operating device 23 of the leading vehicle 1 are omitted.

Figure 9A:
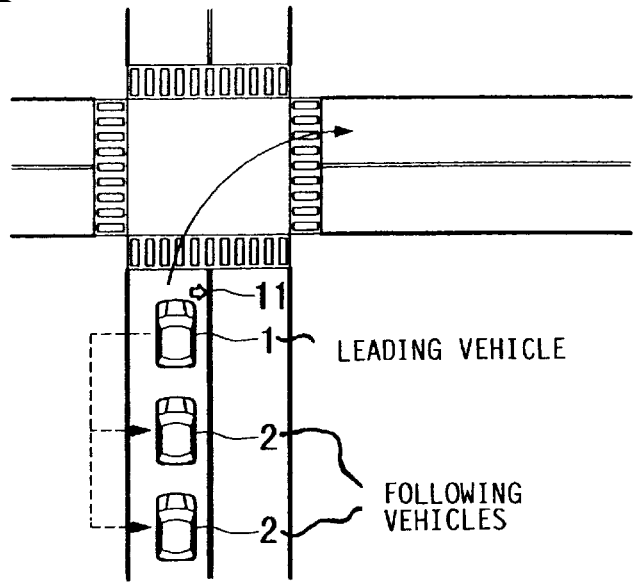
FIGS. 9A to 9C are top views schematically showing the progress of tracking of vehicles using the turn signal control apparatus for the automatic following travel system of the fourth embodiment of the present invention.
Figure 9B:
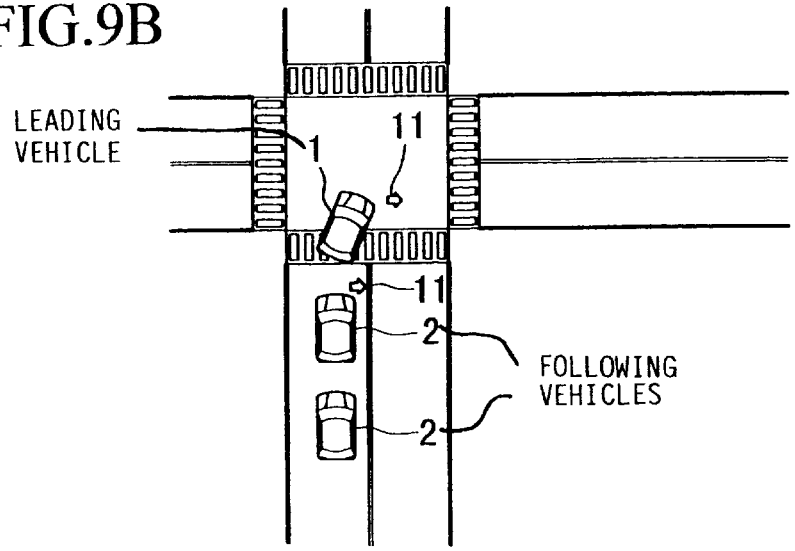
Figure 9C:
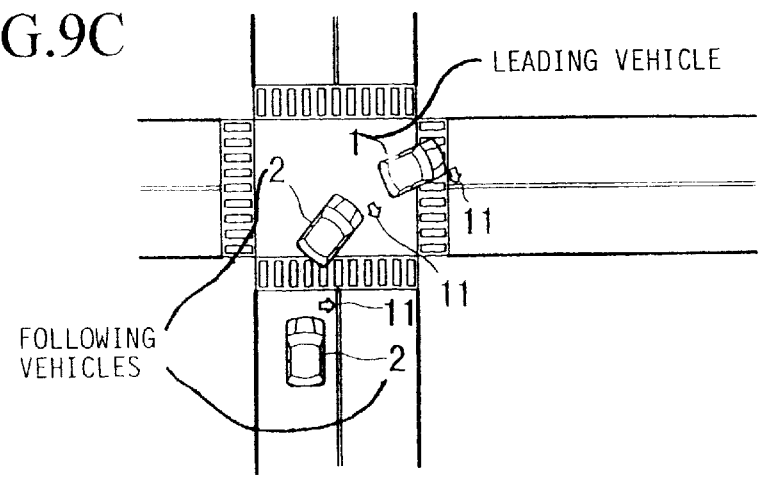

The operation of the turn signal control apparatus in the automatic following system of the fourth embodiment will now be explained with reference to FIGS. 9 to 11.

Figure 10D:
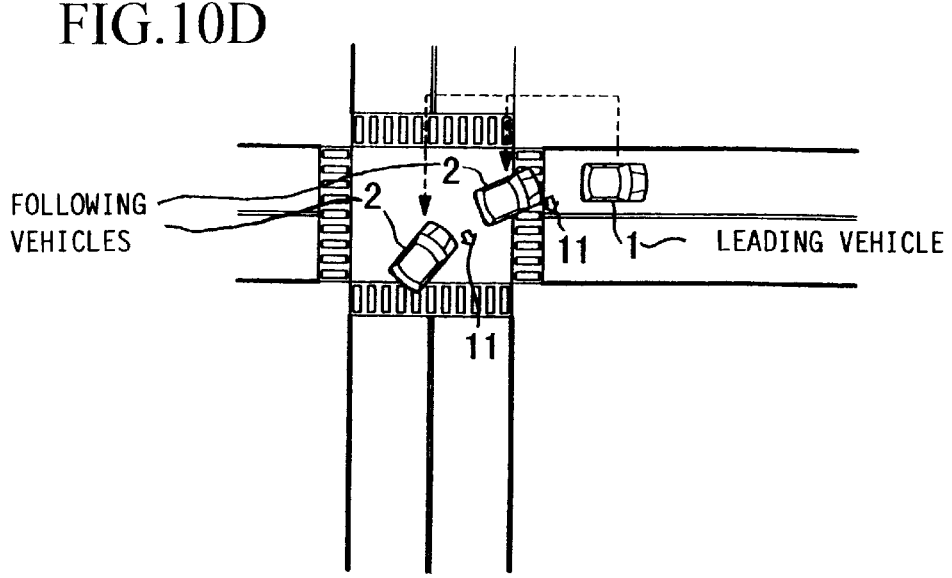
FIGS. 10D to 10F are top views schematically showing the progress of tracking of vehicles using the turn signal control apparatus for the automatic following travel system of the fourth embodiment of the present invention.
Figure 10E:
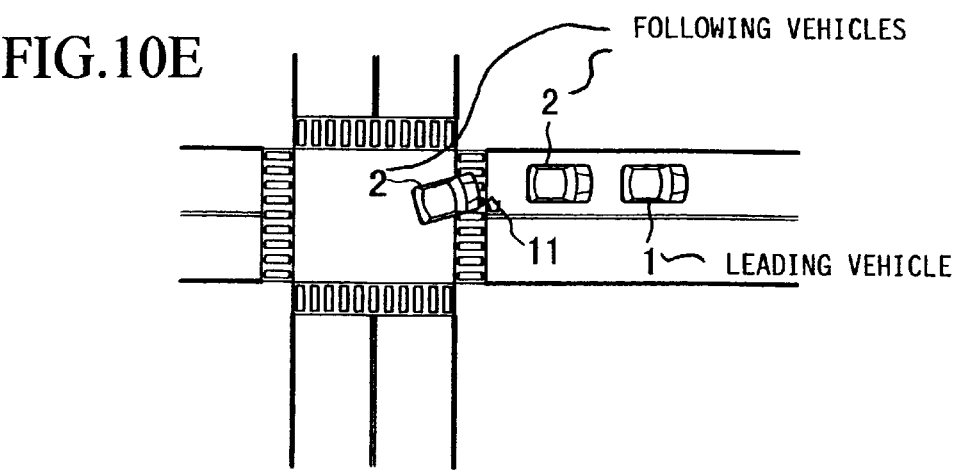
Figure 10F:
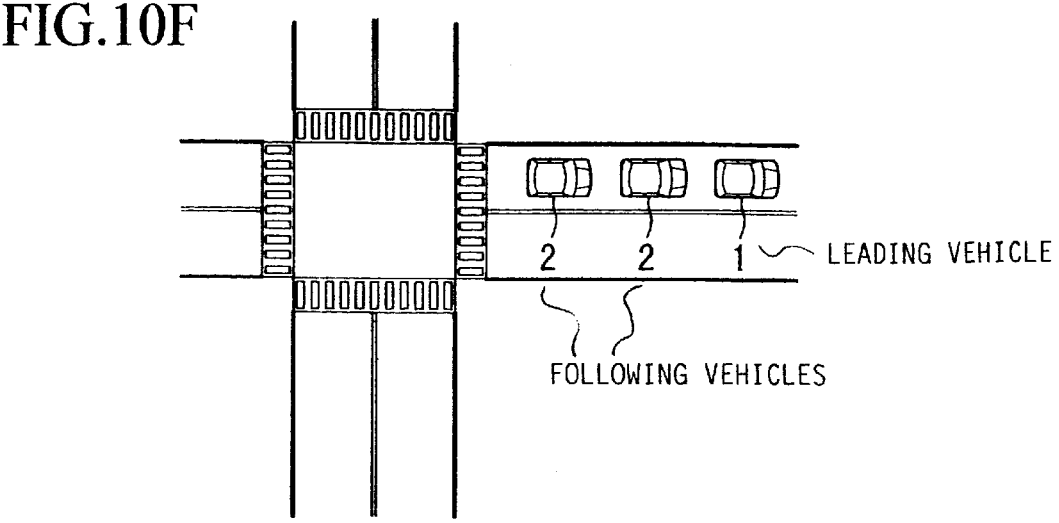
Figure 11:
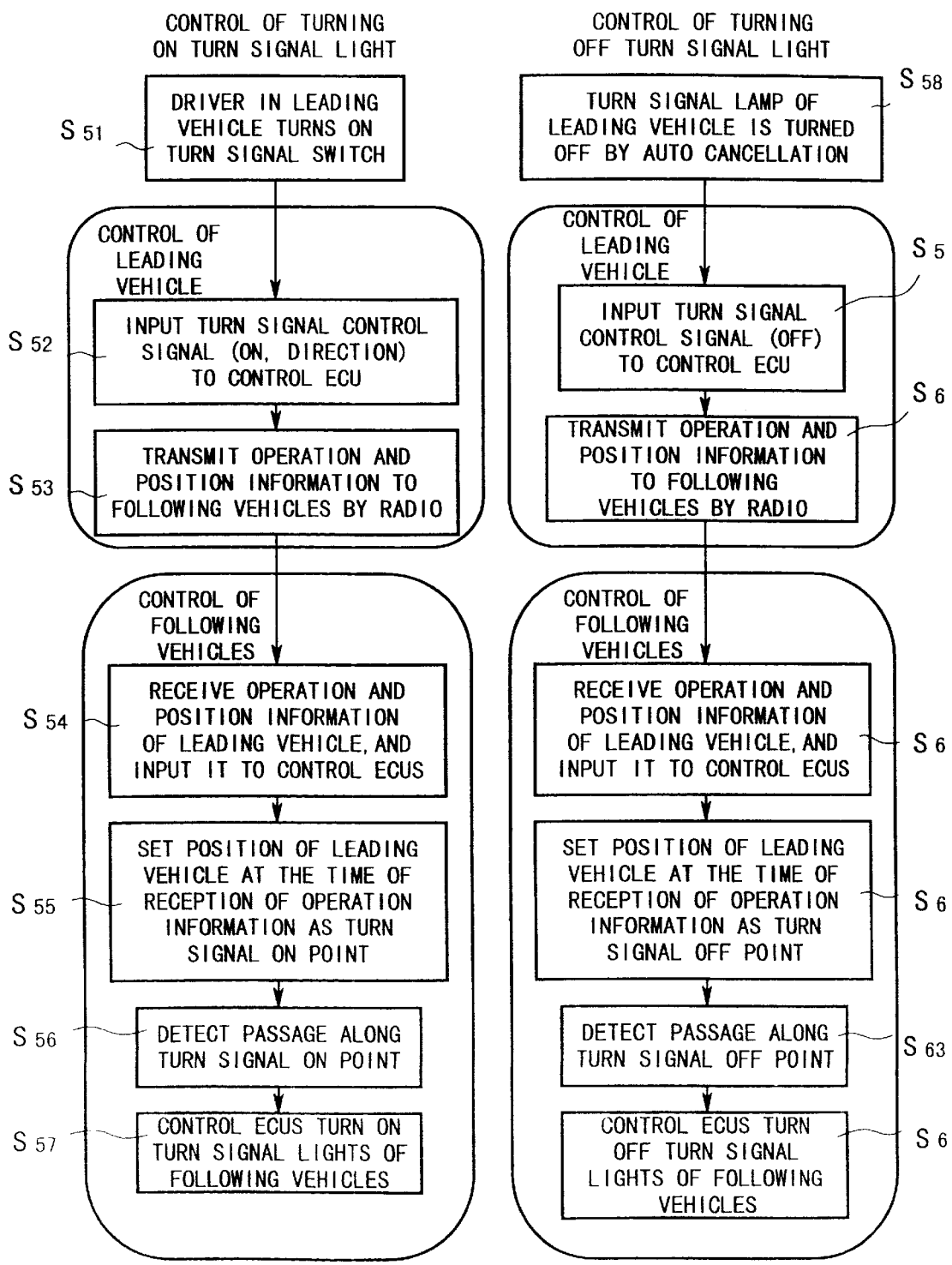
FIG. 11 is a flowchart showing the process of the turn signal control apparatus in the automatic following travel system of the fourth embodiment.

As shown in FIGS. 10 and 11, the description will be made by way of the case in which the vehicles which travel in line turn right in a crossing. The driver in the leading vehicle 1 turns on the turn signal switch 12 (step S51). The switch 12 sends a turn signal ON signal (R), and this signal is input to the control ECU 10 (step S52). The control ECU 10 sends a signal to turn on the turn signal light 11, and the right turn signal light 11 of the leading vehicle 1 flashes on and off. When the control ECU 10 detects the ON signal, the control ECU 10 also produces turn signal operation information (R), and position information of the leading vehicle 1 as to where the turn signal light has been turned on, and transmits the information via the radio communicator 20 and the radio antenna 21 to the following vehicle (step S53).

The following vehicle 2 receives the turn signal ON operation information and the position information from the leading vehicle 1 via the radio antenna 21 and the radio communicator 20, and inputs it to the control ECU 10 (step S54). When receiving the information indicating that the turn signal light of the leading vehicle 1 has been turned on and the position information of the leading vehicle 1, the control ECU 10 stores the point where the leading vehicle 1 has turned on the turn signal light on the track of the leading vehicle 1 according to the data stored in the following vehicle (step S55). Thereafter, when the following vehicle 2 passes the point, the internal position sensor of the following vehicle 2 detects the passage (step S56), the operation signal (R) for turning on the turn signal light 11 is produced based on the detection signal (step S57), and the right turn signal light 11 is flashed on and off.

When the leading vehicle 1 finishes turning right, the driver in the leading vehicle 1 turns off the turn signal switch 12 by, e.g., the auto-cancellation (step S58). Then, the switch 12 inputs a turn signal OFF signal (R) to the control ECU 10 (step S59). The control ECU 10 sends a signal to turn off the turn signal light 11, and the right turn signal lights of the leading vehicle 1 are turned off.

When the control ECU 10 detects the OFF signal, the control ECU 10 also produce turn signal OFF action information (R), and position information as to where the turn signal light of the leading vehicle 1 has been turned off, and the information is transmitted from the radio communicator 20 and the radio antenna 21 to the following vehicles 2 (step S60).

The following vehicle 2 receives the turn signal OFF action information and the position information from the leading vehicle 1 via the radio communicator 20, and inputs it to the control ECU 10 (step S61). When receiving the information indicating that the turn signal light of the leading vehicle 1 has been turned off, and the position information of the leading vehicle 1, the control ECU 10 stores the point where the leading vehicle 1 has turned off the turn signal light on the track of the leading vehicle 1 according to the data stored in the following vehicle (step S62). Thereafter, when the following vehicle 2 passes the point, the internal position sensor detects the passage (step S63), the operation signal for turning off the turn signal light 11 is produced based on the detection signal, and the right turn signal light 11 is turned off (step S64).

Thus, the following vehicles 2 turn on the turn signal lights when the following vehicles themselves enter the crossing, and turn them off when the following vehicles themselves finish turning the crossing.

The present embodiments are to be considered in all respects illustrative and not limiting, and this invention may be embodied in other forms or carried out in other ways without departing from the spirit thereof For example, while the embodiments are described by way of the case in which at the crossing the turn signal light of the unmanned following vehicles traveling in line are turned on or off, corresponding to the on-off actions of the manned leading vehicle, this invention can be applied when the vehicles change lanes.

In this case, as shown in FIG. 12, the following vehicle receives turn signal operation information from the leading vehicle (step S71), obtains road information from map data stored in a navigation system incorporated in the following vehicle (step S72), determines whether the following vehicle is near a crossing (step S73), operates the turn signal light where the leading vehicles has operated the turn signal light, as described in the third and fourth embodiments, when the following vehicle is near the crossing (step S74), and determines that the vehicles simply change traffic lanes and operates the turn signal light at the same time as the operation of the leading vehicle when the following vehicle is not near the crossing (step S75).

[Fifth Embodiment]

FIGS. 13 to 17 show the fifth embodiment of the present invention.

Figure 13A:
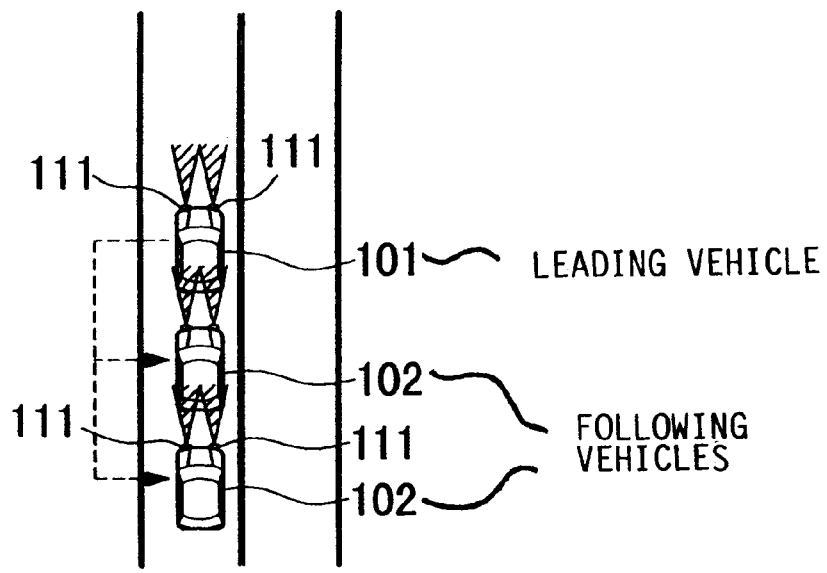
FIGS. 13A and 13B are top views schematically showing the progress of tracking of vehicles using a lighting control apparatus for the automatic following travel system of the fifth embodiment of the present invention.
Figure 13B:
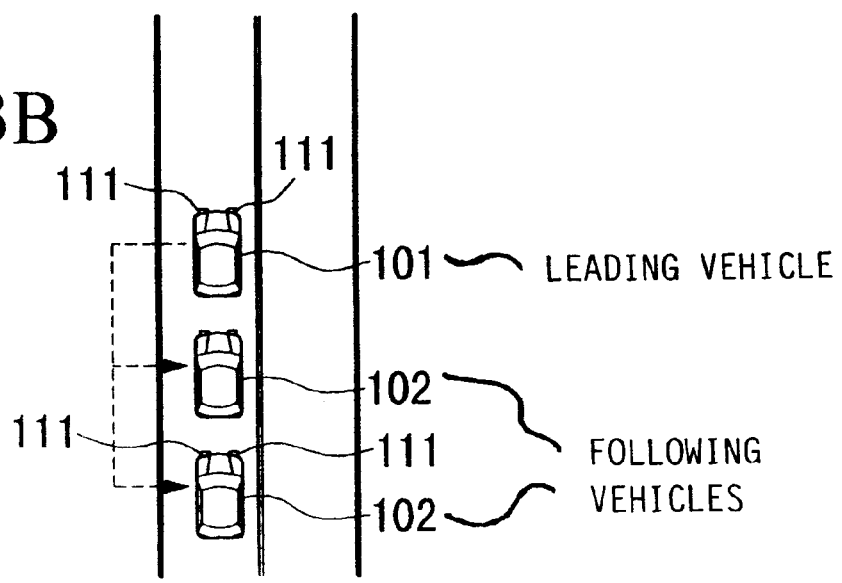

FIGS. 13A and 13B show electric vehicles which travel in line. The electric vehicles consist of a leading vehicle 101 driven by a driver, and following vehicles 102. While the following vehicle 102 may be single or plural, this embodiment includes two following vehicles.

The leading vehicle 101 and the following vehicles 102 are electric vehicles each of which uses an electric motor as its driving source, conducts manned or unmanned travel, and is driven by supplying electric power from a battery to a motor controlled by a control ECU (Electronic Control Unit) for controlling the driving force and by rotating wheels by the motor.

Each of the electric vehicles of the leading vehicle 101 and the following vehicles 102 has a control ECU 110 for performing all driving control, in addition to the control ECU for controlling the driving force. Irrespective of the leading vehicle or the following vehicles, all the vehicle have both functions of the leading vehicle and of the following vehicle. Therefore, the control ECU 110 includes both control functions for acting as the leading vehicle and for acting as the following vehicle.

Figure 14:
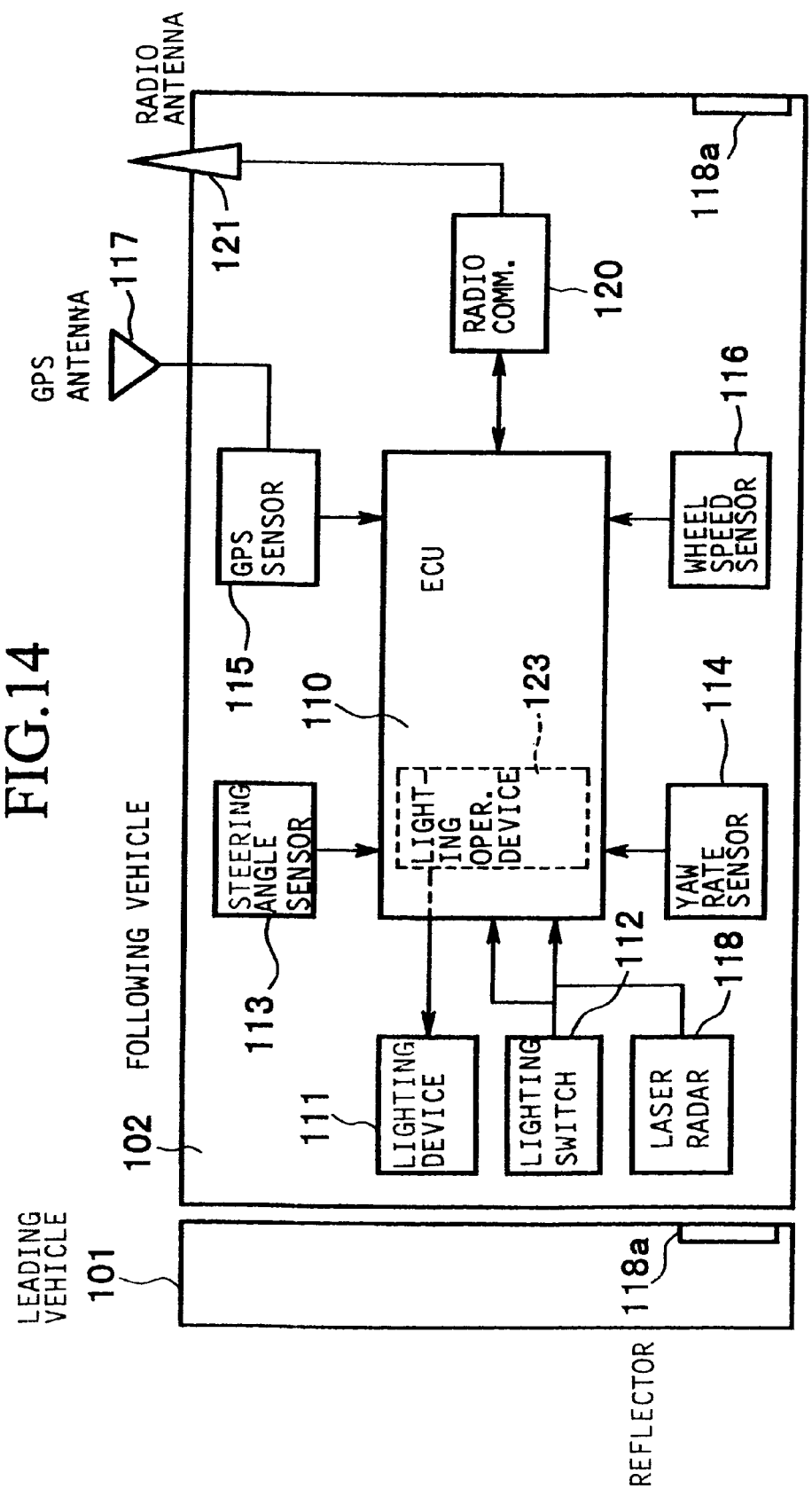
FIG. 14 is a block diagram showing the lighting control apparatus in the automatic following travel system of the fifth embodiment.

As shown in FIG. 14, the control ECU 110 includes a lighting device 111 (such as headlights, positioning lights, hazard lights, and stop lights), a switch 112 for turning on or off the lighting device 111, a laser radar 118 for measuring the distance and the direction (angle) from the vehicle to a vehicle immediately in front of that vehicle, a yaw rate sensor 114 for detecting the angular velocity of the vehicle in the transverse direction (steering direction), a GPS sensor 115 for measuring the present position (latitude/longitude) of the vehicle, and a wheel speed sensor 116 for detecting the wheel speed of the vehicle.

A GPS antenna 117 for receiving radio waves from a GPS satellite is connected to the GPS sensor 115. The laser radar 118, the yaw rate sensor 114, and the wheel speed sensor 116 are used to control the automatic following travel of the following vehicle 102.

The laser radar 118 emits the laser light toward a reflector 118a attached to the rear of the leading vehicle 101 or the following vehicle 102, and based on the reflected light, the distance and the direction (angle) from the vehicle to the vehicle in front can be measured.

A radio communicator 120 is connected to the control ECU 110, and sends the information of the operation, which was input via the lighting switch 112, from the leading vehicle 101 through the radio antenna 121 to the following vehicle 102.

The radio communicator 120 is used when sending control data required for the automatic travel in line (such as the vehicle position (x, y) and the direction θ, and the amount of operation of the accelerator, the brake, and the steering), in addition to the information concerning lighting operation, from leading vehicle 101 to the following vehicle 102, and when reporting the driving condition from the following vehicle 102 to the leading vehicle 101.

The control ECU 110 includes a lighting operating device 123 which is utilized when the vehicle acts as the following vehicle 102. The lighting operating device 123 receives the information concerning the lighting operation of the leading vehicle 101 via the radio communicator 120, and, based on this received information, sends an operation signal to the lighting device 111 to turn on or off the lighting device 111, corresponding to the condition of the lighting device 111 of the leading vehicle 101.

The lighting operating device will be discussed in detail later in the description of the operation.

The control ECU 110 sends the control signals to a driving motor, an electrically-operated power steering, and an electrically-operated brake device (not shown) to travel in line.

Specifically, in the leading vehicle 101, the driving motor, the electrically-operated power steering, and the electrically-operated brake are controlled by the control signals from the control ECU, depending on the amount of operation of the accelerator, the brake, and the steering. The position of the leading vehicle 101 is detected by the yaw rate sensor 114, the GPS sensor 115, and the wheel speed sensor 116.

The information of the amount of operation of the accelerator, the brake, and the steering, and the position of the leading vehicle are transmitted through the radio communicator 120 to the respective following vehicles 102.

In the following vehicle 102, the driving motor, the electrically-operated power steering, and the electrically-operated brake are controlled by the control signals from the control ECU 110, depending on the amount of operation of the accelerator, the brake, and the steering, and on the position information of the vehicle and the vehicle in front of that vehicle detected by the laser radar 118 which is a relative position sensor.

The operation of the lighting control apparatus in the automatic following system will now be explained.

Figure 15:
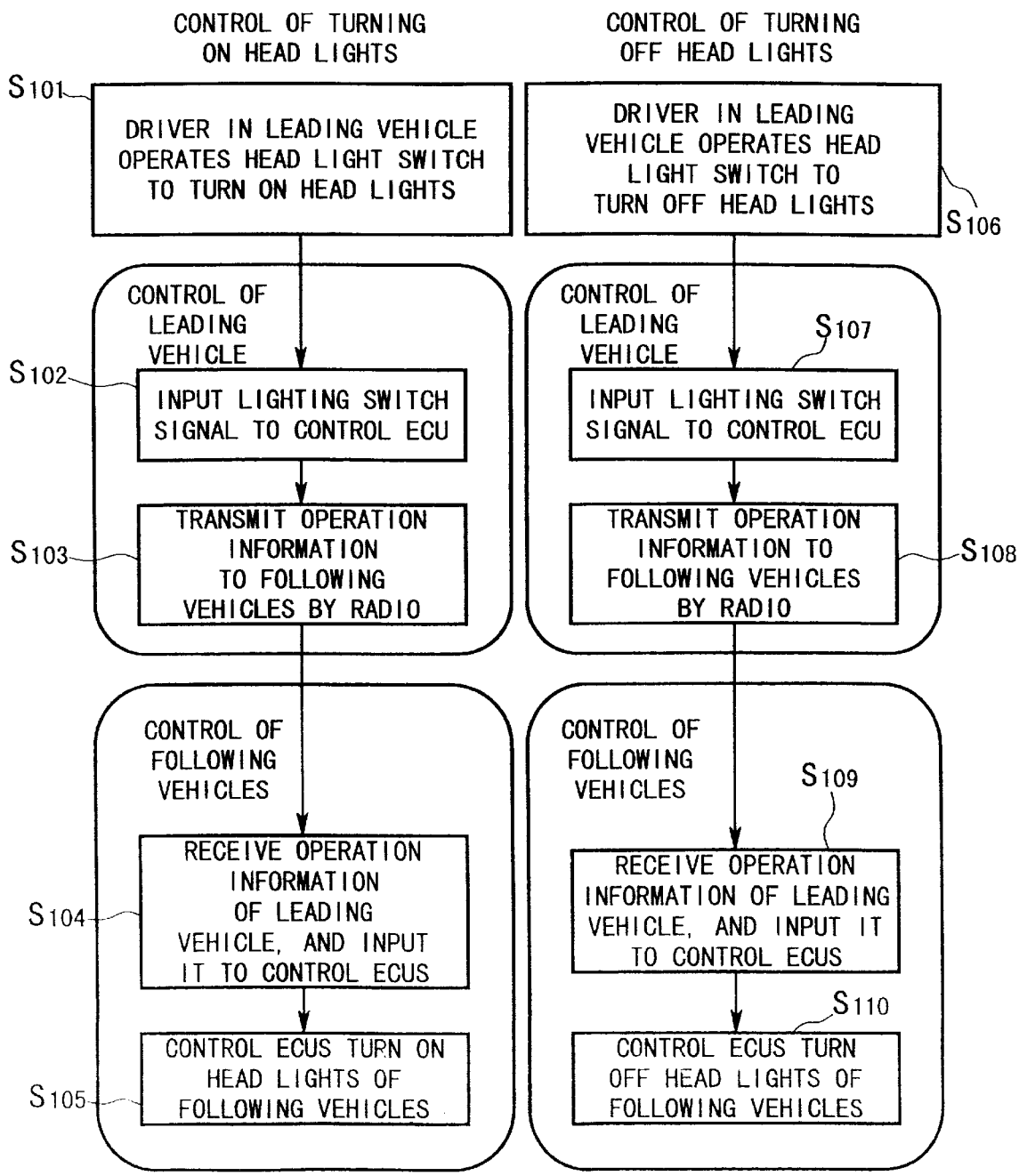
FIG. 15 is a flowchart showing the process of the lighting control apparatus in the automatic following travel system of the fifth embodiment.

As shown in FIGS. 13A and 13B, when it gets dark while the vehicles travel in line, the driver in the leading vehicle 101 turns on the lighting switch 112 for the headlights (step S101 in FIG. 15). The switch 112 inputs a headlight ON signal (Lo) to the control ECU 110 (step S102). Then, the control ECU 110 sends the signal to turn on the headlights (which is included in the lighting device 111), and thus the headlights of the leading vehicle 101 are turned on.

When the control ECU 110 detects the headlight ON signal and sends the signal to turn on the headlights, the control ECU 110 also produces information concerning the operation of the headlights (Lo), and transmits this information from the radio communicator 120 and the radio antenna 121 to the following vehicles 102 (step S103).

The information concerning the operation of the lighting switch may be transmitted together with the control data required for the automatic travel in line, and may be transmitted separately.

The following vehicle 102 receives the information concerning the operation of the lighting of the leading vehicle 101 via the radio antenna 121 and the radio communicator 120, and inputs it to the control ECU 110 (step S104). When the control ECU 110 receives this information, the lighting operating device 123 outputs a signal (Lo) to turn on the headlights, and thus the headlights of the following vehicle 102 are turned on (step S105) in FIG. 13A.

To turn off the headlights of the following vehicles traveling in line, the driver in the leading vehicle 101 turns off the lighting switch 112 for the headlights (step S106). Then, the switch 112 inputs a headlight OFF signal (OFF) to the control ECU 110 (step S107). Then, the control ECU 110 sends a signal to turn off the headlights, and the headlights of the leading vehicle 101 are turned off.

When the control ECU 110 detects the OFF signal, the control ECU 110 also produces information concerning the OFF action of the headlights, and this OFF action information is transmitted from the radio communicator 120 and the radio antenna 121 to the following vehicles 102 (step S108).

The following vehicle 102 receives the OFF action information via the radio antenna 121 and the radio communicator 120, and inputs it to the control ECU 110 (step S109). When the control ECU 110 receives the OFF action information of the headlights, the lighting operating device 123 outputs an OFF signal (OFF) to the headlights, and thus the headlights of the following vehicle 102 are turned off (step S110) in FIG. 13B.

According to the lighting control apparatus, the driver in the leading vehicle does not have to go to the respective following vehicles to turn on or off the headlights. As the driver simply turns on or off the headlight switch 112 of the leading vehicle 101, the lighting devices 111 of the following vehicles 102 are automatically turned on or off, reducing labor of the driver who operates the lighting.

Further, the driver does not have to directly turn on or off the headlights of the following vehicles, thereby shortening a time required to start travel in line at night, and also shortening a time required to terminate the travel in line.

Figure 16:
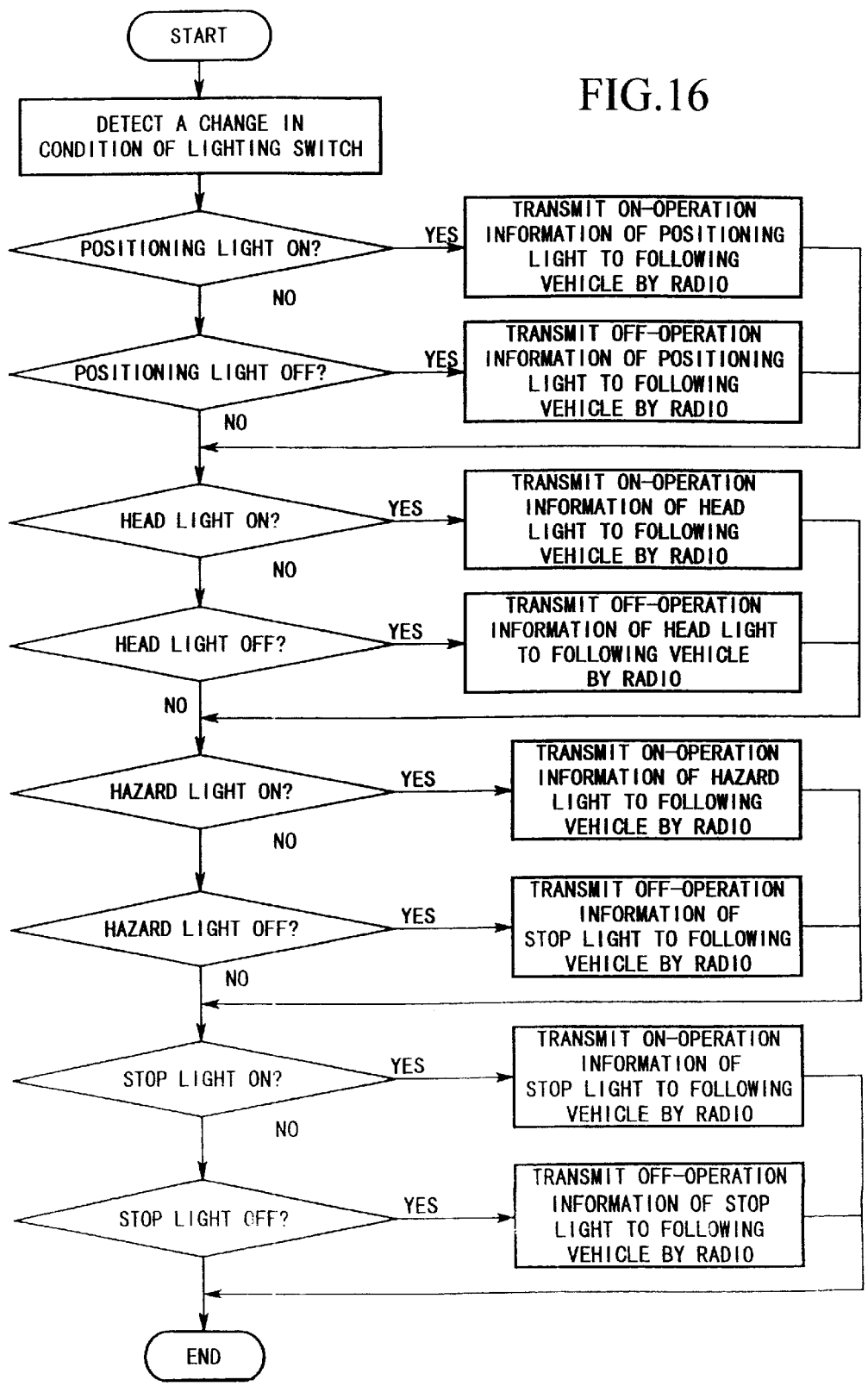
FIG. 16 is a flowchart showing a modification of the process carried out in the leading vehicle of the lighting control apparatus in the automatic following travel system of the fifth embodiment.
Figure 17:
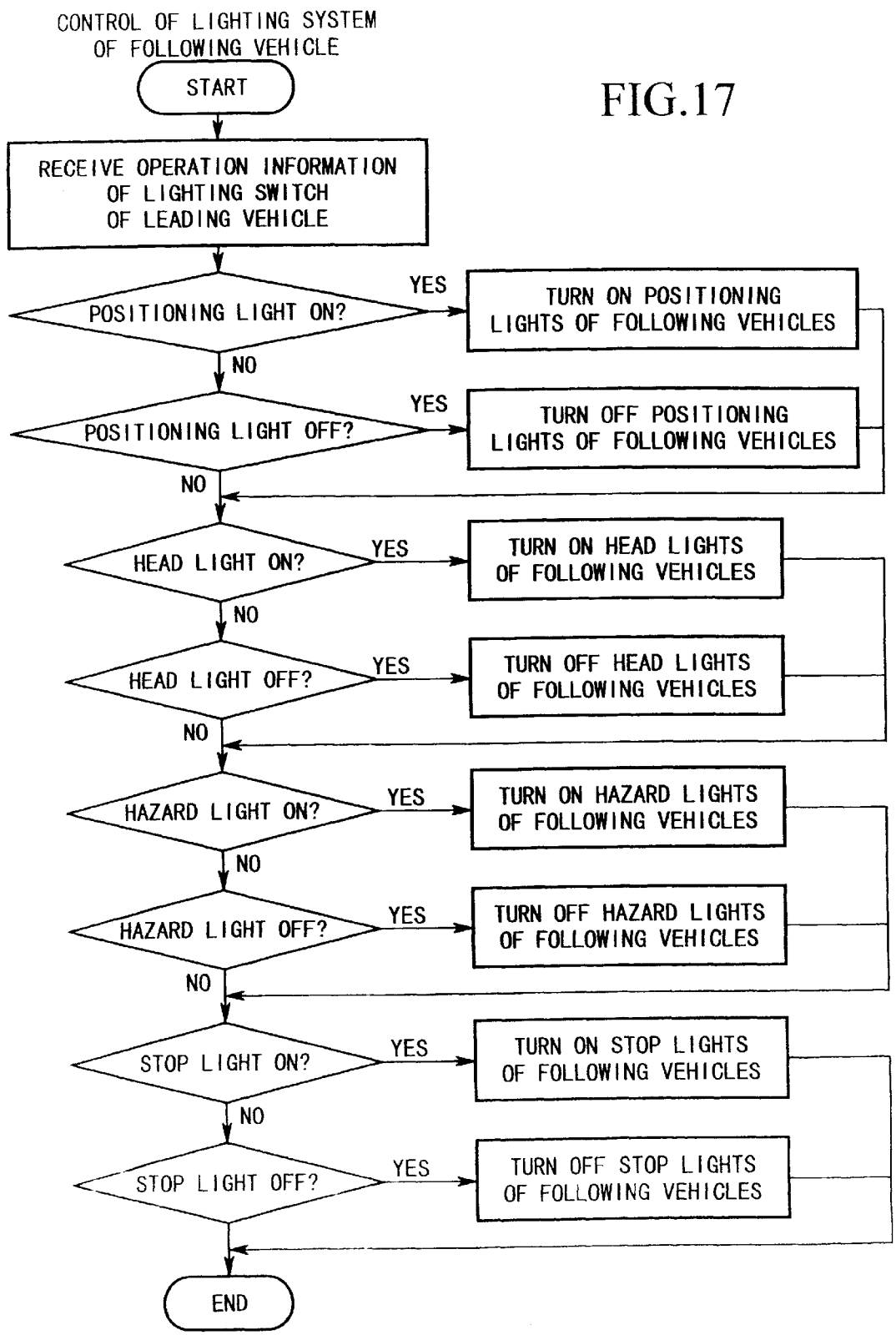
FIG. 17 is a flowchart showing a modification of the process carried out in the following vehicle of the lighting control apparatus in the automatic following travel system of the fifth embodiment.

While the lighting control apparatus is explained by way of the headlights, the present invention is not limited to the headlights, and may be applied to positioning lights, hazard lights, stop lights, and a combination thereof, as shown in FIGS. 16 and 17.

[Sixth Embodiment]

Figure 18A:
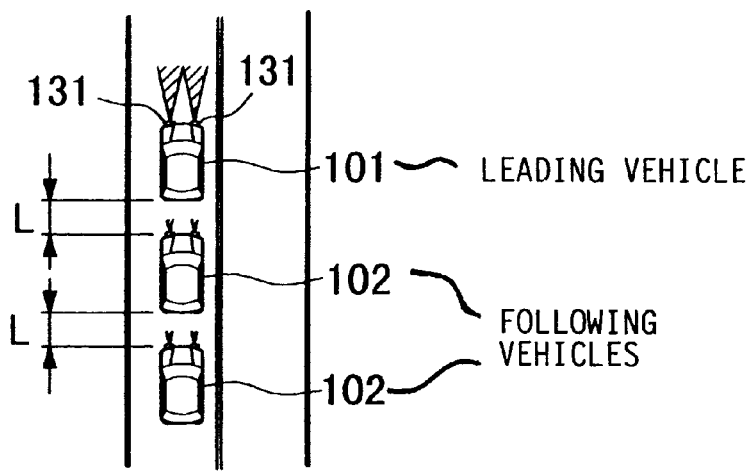
FIGS. 18A to 18C are top views schematically showing the progress of tracking of vehicles using a lighting control apparatus for the automatic following travel system of the sixth embodiment of the present invention.
Figure 18B:
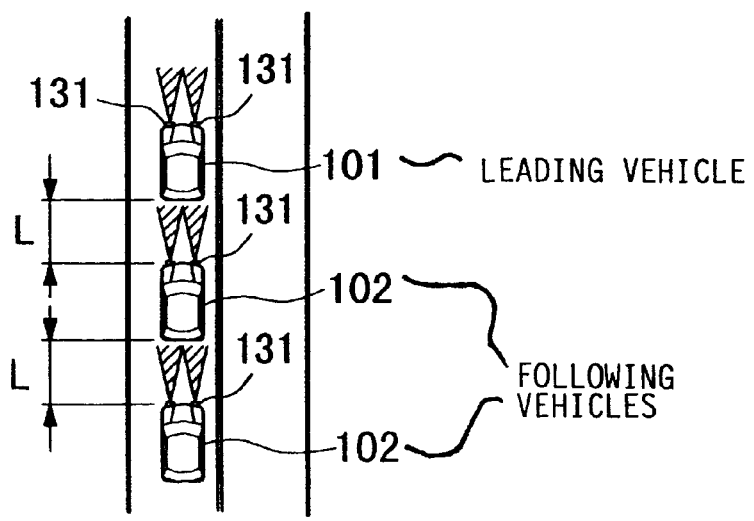
Figure 18C:
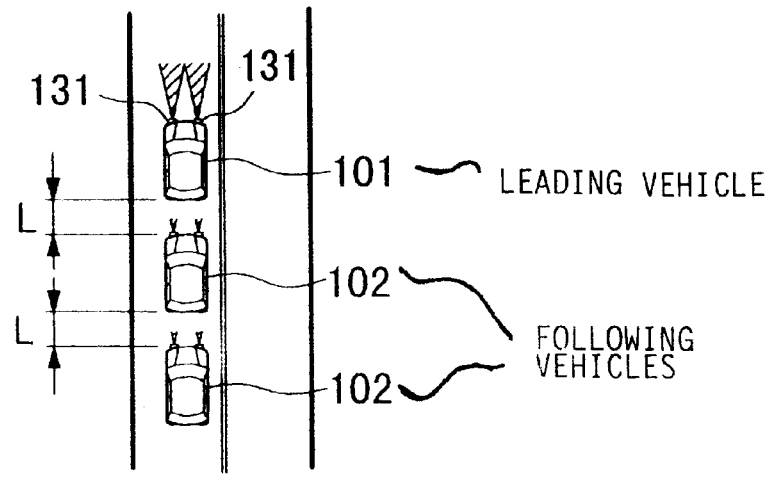
Figure 19:
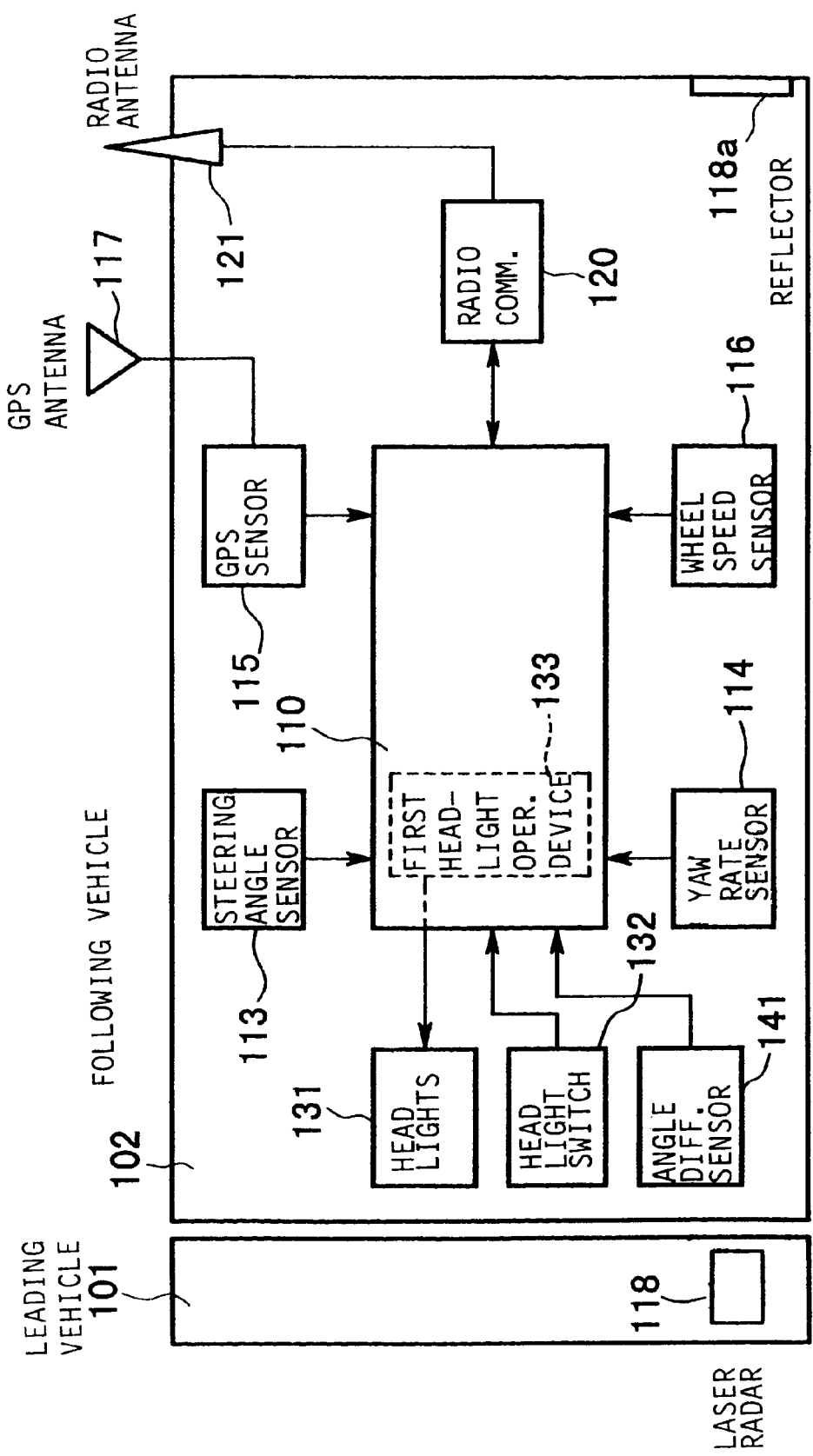
FIG. 19 is a block diagram showing the lighting control apparatus in the automatic following travel system of the sixth embodiment.
Figure 20:
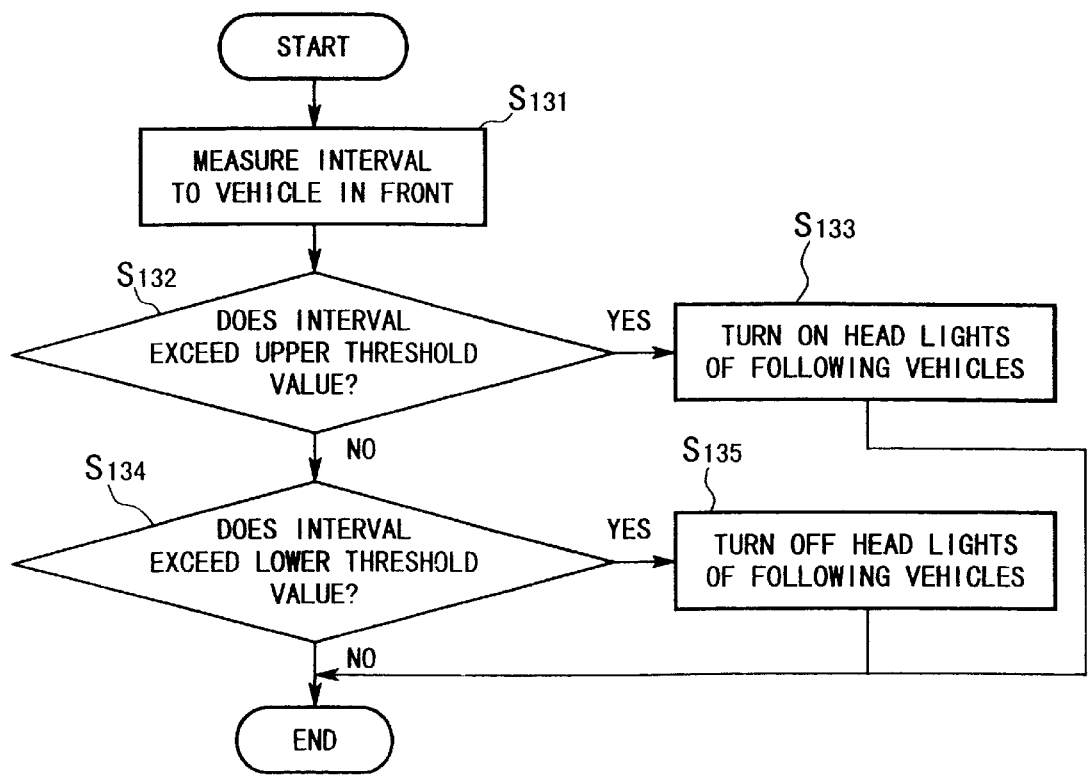
FIG. 20 is a flowchart showing the process of the lighting control apparatus in the automatic following travel system of the sixth embodiment.

FIGS. 18 to 20 show the sixth embodiment of the present invention.

When the vehicle travels in line at a short interval, they may almost appear to a pedestrian or a driver in another vehicle as one grouping, and can be noticed by the headlights of the leading vehicle 101. Therefore, the following vehicle 102 have only to turn on the positioning lights. When the intervals between the vehicles are comparatively long, because they may not appear as one grouping, the following vehicles 102 cannot be noticed unless the respective following vehicles 102 turn on their headlights.

In the sixth embodiment, the following vehicle 102 has a first headlight device 33 for controlling the ON- or OFF operation for the headlights, depending on the interval between the following vehicle 102 and another vehicle in front of the following vehicle.

The following vehicle 102 includes: a laser radar 118 for measuring the distance from the following vehicle 102 to another vehicle in front, which is the leading vehicle 101 or another following vehicle 102, and the first headlight operating device 133. The first headlight operating device 133 turns on the headlights when a value measured by the laser radar 118 exceeds a first predetermined value (upper threshold value) while the headlights have been turned on. Further, the first headlight operating device 133 turns off the headlights 131, and turns on positioning lights, when the value measured by the laser radar 118 is below a second predetermined value (lower threshold value) even while the headlight switch 132 has been turned on (see FIG. 19).

The predetermined values are intervals between the following vehicle 102 and the vehicle in front when the light from the headlights 131 of the following vehicle 102 reach not only the vehicle in front but also the vicinity of the vehicle in front, and specifically, approximately 3 to 4 meters. The sixth embodiment defines upper and lower predetermined values. The headlights are turned on when the interval between the following vehicle and the vehicle in front exceeds the upper threshold value (e.g., 4 m). The headlights 131 are then turned off when the interval between the following vehicle and the vehicle in front is below the lower threshold value (e.g., 3 m).

A device for measuring the interval between the following vehicle and the vehicle in front is not limited to the laser radar, and may uses a method for receiving track data (a driving distance, coordinates, and a GPS measurement result) of the vehicle in front via the radio communicator 120 and calculating the interval from the relative position of the following vehicle.

In the construction shown in FIG. 19, reference numerals which are identical to the fifth embodiment in FIG. 14, respectively, indicate elements which are identical to those of the fifth embodiment, and a detailed description is omitted.

The operation of the lighting control apparatus in the automatic following system of the sixth embodiment will now be explained with reference to FIGS. 18 and 20.

When traveling in line, the respective following vehicles 102 travel while measuring the intervals between the vehicles in front using the laser radar 118 (step S131). Because it is night, the headlight switch 132 has been turned on. That is, in a manner similar to the fifth embodiment, the driver in the leading vehicle 101 turns on the headlight switch 132, this information is transmitted to the vehicles via the radio communicator 120, and thus the headlight switch 132 in the respective following vehicle 102 has been turned on.

The results of the measurement of the laser radar 118 are continuously input to the first headlight operating devices 133 in the control ECUs 110. Each of the first headlight operating devices 133 determines whether the measured interval L requires turning on the headlights 131 or not, that is, whether the measure interval L exceeds the upper predetermined threshold value or not (step S132). When the interval L exceeds the threshold value, the first headlight operating device 133 turns on the headlight of the following vehicle as shown in FIG. 18B (step S133).

When the measured interval L does not exceed the upper predetermined threshold value, it is determined whether the interval L is equal to or below the lower one (step S134). When the interval L is equal to or below the lower threshold value, the headlights 131 of the following vehicle 102 are turned off (step S135), and the positioning lights are turned on. When the interval L exceeds the lower threshold value, the headlights 131 are not turned off, and are kept on.

When the vehicles travel in line at a short interval, only the headlights 131 of the leading vehicle are turned on, as shown in FIGS. 6A and 6C, and the following vehicles turn on the positioning lights. When the interval between the vehicles is increased, the headlights 131 of the following vehicles 102 are automatically turned on.

This embodiment defines two threshold values for determining whether the headlights 131 are to be turned on or off, turns of the headlights 131 when the interval L between the following vehicle and the vehicle in front exceeds the upper threshold value, and turns off the headlights 131 when the interval L between the following vehicle and the vehicle in front is equal to or below the lower threshold value. Therefore, the repetition of turning on and off the headlights can be prevented even when the interval between the following vehicle and the vehicle in front of that vehicle changes in a short period of time,

[Seventh Embodiment]

FIGS. 21 to 24 show the seventh embodiment of the present invention.

When differences in angle between the vehicles which travel in line are small, they may almost appear to a pedestrian or a driver in another vehicle as one grouping, and can be noticed by the headlights of the leading vehicle 101. Therefore, the following vehicles have only to turn on the positioning lights. As the differences in angle between the leading vehicle 101 and the following vehicles 102 increase, the headlights of the leading vehicle 101 are turned in a direction different from those of the following vehicles 102.

In this case, when the following vehicles 102 do not turn on the headlights, the vehicles may not be noticed.

Figure 22D:
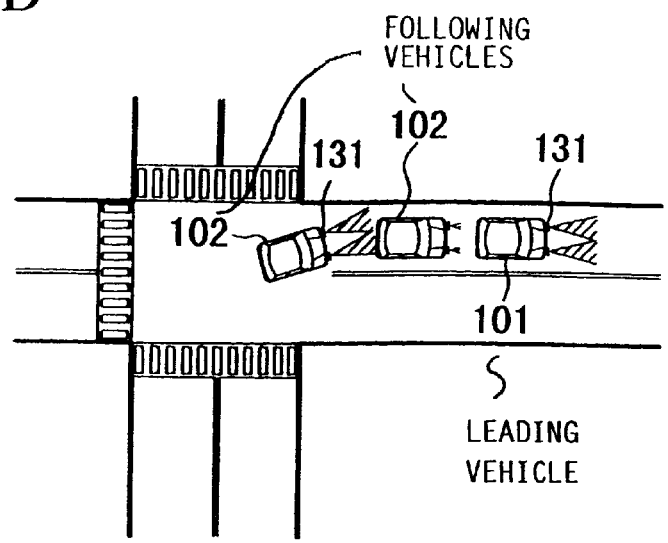
FIGS. 22D and 22E are top views schematically showing the progress of tracking of vehicles using a lighting control apparatus for the automatic following travel system of the seventh embodiment of the present invention.
Figure 22E:
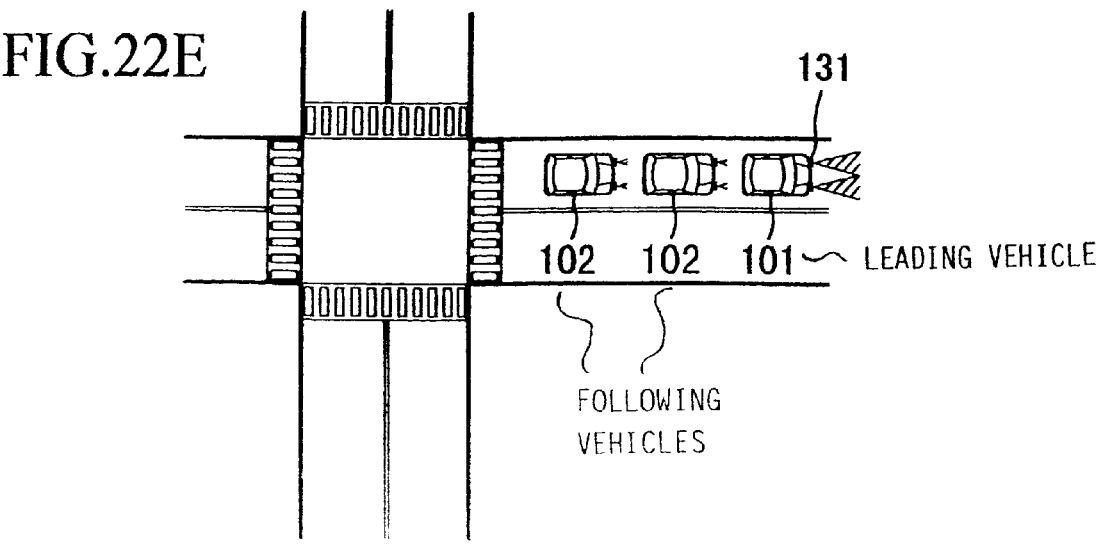
Figure 23:
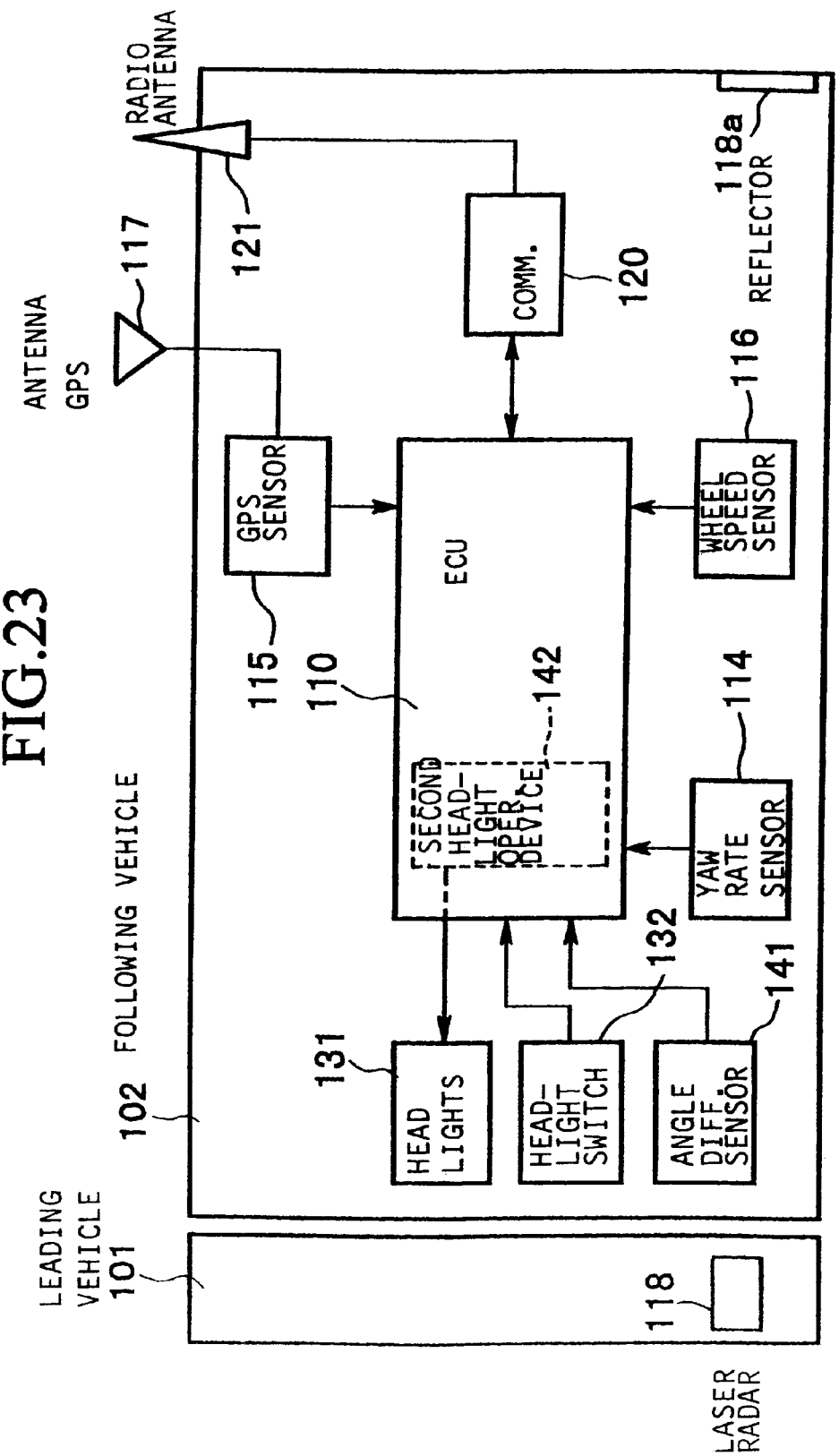
FIG. 23 is a block diagram showing the lighting control apparatus in the automatic following travel system of the seventh embodiment.

The seventh embodiment includes a angle difference sensor 141 for detecting the difference in angle between one vehicle and a vehicle in front of that vehicle, and a second headlight operating device 142 for turning on or off the headlights, based on the value detected by the angle difference sensor 141 (see FIG. 22).

The second headlight operating device 142 turns on the headlights 131 when the value measured by the angle difference sensor 141 exceeds a first predetermined value (upper threshold value) while the headlight switch 132 has been turned on. Further, the second headlight operating device 142 turns off the headlights 131, and turns on the positioning lights, when the value measured by the angle difference sensor 141 is equal to or below a second predetermined value (lower threshold value) while the headlight switch 132 is turned on.

The predetermined values are relative angles between the following vehicle and the vehicle in front when the light from the headlights 131 of the following vehicle reach not only the vehicle in front but also the side of the vehicle in front, and specifically, approximately 20 to 35 degrees. The seventh embodiment defines upper and lower predetermined values (threshold values). The headlights 131 are turned on when the angle between the following vehicle and the vehicle in front exceeds the upper threshold value (e.g., 35 degrees). The headlights 131 are turned off when the angle between the following vehicle and the vehicle in front is below the lower threshold value (e.g., 20 degrees).

A device for measuring the difference in angle between the following vehicle and the vehicle in front is not limited to the laser radar, and may use a method for receiving track data (a driving distance, coordinates, and a GPS measurement result) of the vehicle in front via the radio communicator 120 and calculating the angle from the relative position of the following vehicle.

In the construction shown in FIG. 22, reference numerals which are identical to the fifth and sixth embodiments, respectively, indicate elements which are identical to those of the fifth embodiment, and a detailed description is omitted.

Figure 24:
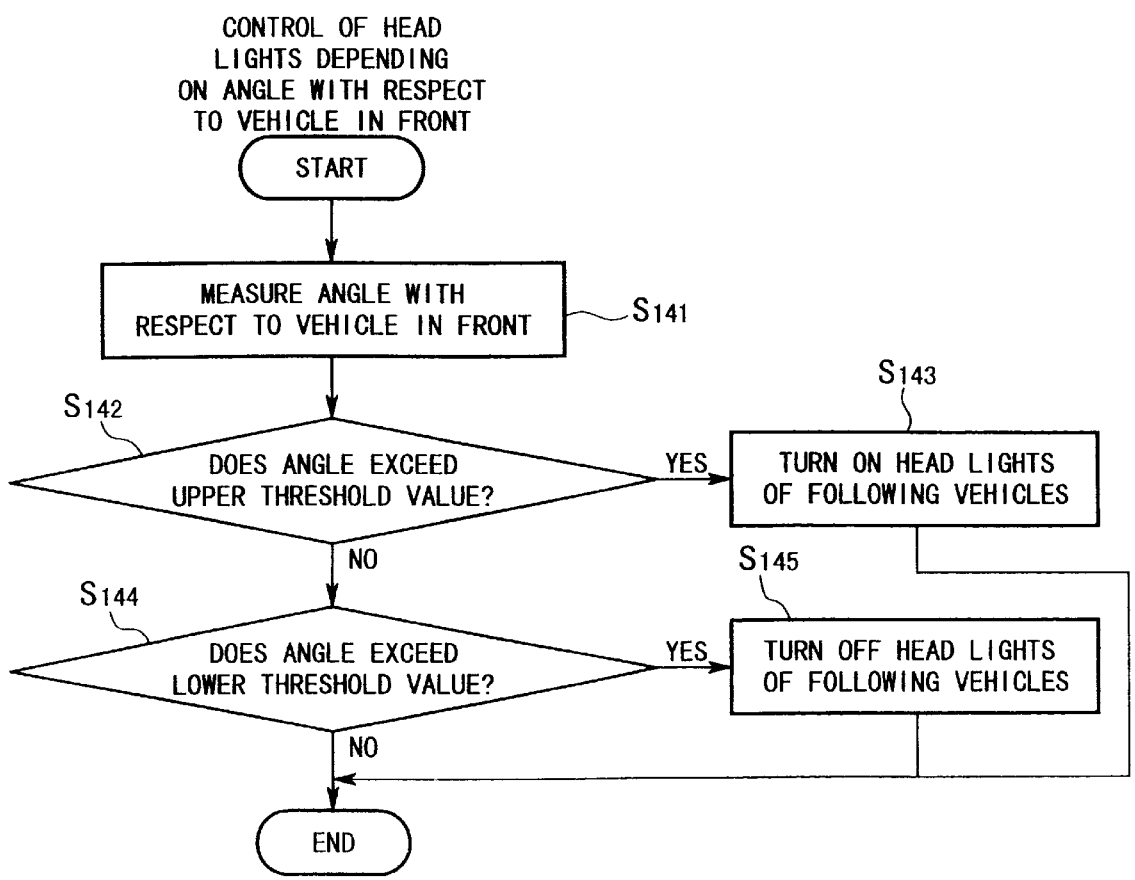
FIG. 24 is a flowchart showing the process of the lighting control apparatus in the automatic following travel system of the seventh embodiment.

The operation of the lighting control apparatus in the automatic following system of the seventh embodiment will now be explained with reference to FIGS. 21, 22, and 24.

The following vehicles 102 travel in line while measuring the differences in angle between vehicles in front of those vehicles by the angle difference sensors 141 such as laser radar (step S141). The headlight switches 132 have been turned on because it is night.

The results of the angle difference sensors 141 are continuously input to the second headlight operating devices 142 of the control ECUs 110.

Figure 21A:
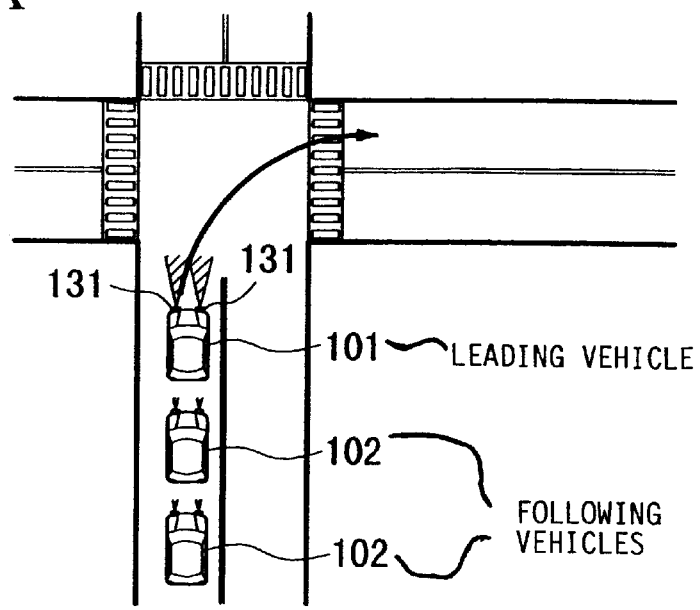
FIGS. 21A to 21C are top views schematically showing the progress of tracking of vehicles using a lighting control apparatus for the automatic following travel system of the seventh embodiment of the present invention.
Figure 21B:
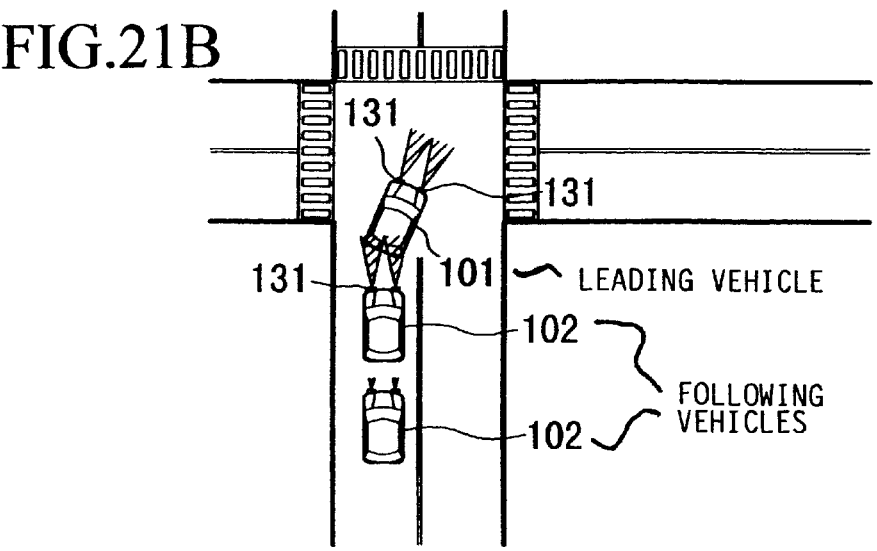
Figure 21C:
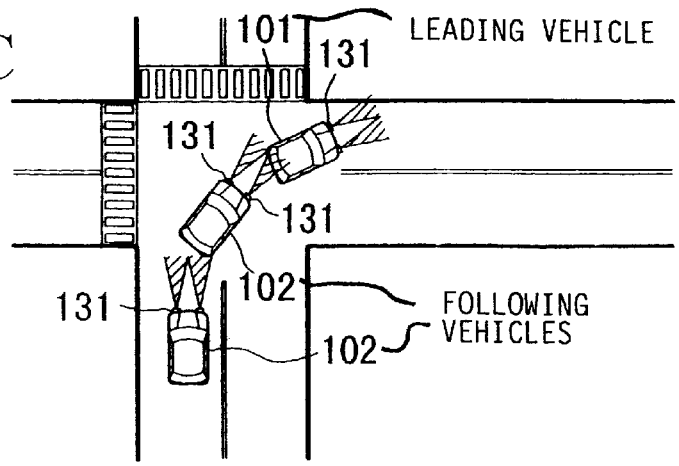

The leading vehicle 101 turns right in a crossing. At that time, as shown in FIG. 21A, the leading vehicle 101 has turned on the headlights 131, and the following vehicles 102 have turned on the positioning lights. Then, the second headlight operating device 142 of each following vehicle 102 determines whether the measured difference in angle requires turning on the headlights 131, that is, whether the difference in angle exceeds the upper threshold value (step S142). When the difference in angle between one following vehicle and the vehicle in front of that vehicle exceeds the upper threshold value, the following vehicle 102 immediately behind the leading vehicle 101 turns on the headlights, as shown in FIG. 21B (step S143). Similarly, when the following vehicle immediately behind the leading vehicle 101 starts turning right, the next following vehicle turns on the headlights 131, as shown in FIG. 21C.

The above determination is repeated at a predetermined interval of time.

When completing the turning right, the difference in angle between the leading vehicle 101 and the following vehicle 102 immediately after the leading vehicle 101 does not exceed the upper threshold value, and then it is determined whether the difference in angle is equal to or below the lower threshold value or not (step S144). When the difference in angle is equal to or below the lower threshold value, the following vehicle 102 turns off its headlights 131 (step S145), and turns on its positioning lights, as shown in FIG. 22D. When the difference in angle exceeds the lower threshold value, the headlights are not turned off, and are kept on.

When the second following vehicle 102 completes the right turn, that is, when the difference in angle between the second following vehicle 102 and the third following vehicle 102 is equal to or below the lower threshold value, the third following vehicle 102 turns off its headlights, and turns on its positioning lights.

Thus, when the vehicles travel in line while maintaining small differences in angle, only the leading vehicle 101 turns on its headlights 131, and the following vehicles 102 do not turn on their headlights 131 and turn only the positioning lights, thereby preventing the batteries from being wasted. When the difference in angle between the following vehicles and the vehicles in front of those vehicles increase, the following vehicles 102 automatically turn on their headlights 131 to make pedestrians and drivers in oncoming vehicles aware the existences of the vehicles.

This embodiment defines upper and lower threshold values for determining whether the headlights are to be turned on or off, turns on the headlights when the difference in angle between the following vehicle and the vehicle in front exceeds the upper threshold value, and turns off the headlights when the difference in angle between the following vehicle and the vehicle in front is equal to or below the lower threshold value. Thus, the repetition of turning on and off the headlights at short intervals can be prevented.

While in the above embodiment the difference in angle between the following vehicle and the vehicle in front is used to determine whether the headlights are turned on or off, lateral deviation of the following vehicle with respect to the vehicle in front may also be used.

A lateral deviation sensor may calculate the lateral deviation of the following vehicle with respect of the vehicle in front, based on the difference in angle and the relative distance between the following vehicle and the vehicle in front which are obtained by the laser radar. [Eighth Embodiment]

Figure 25A:
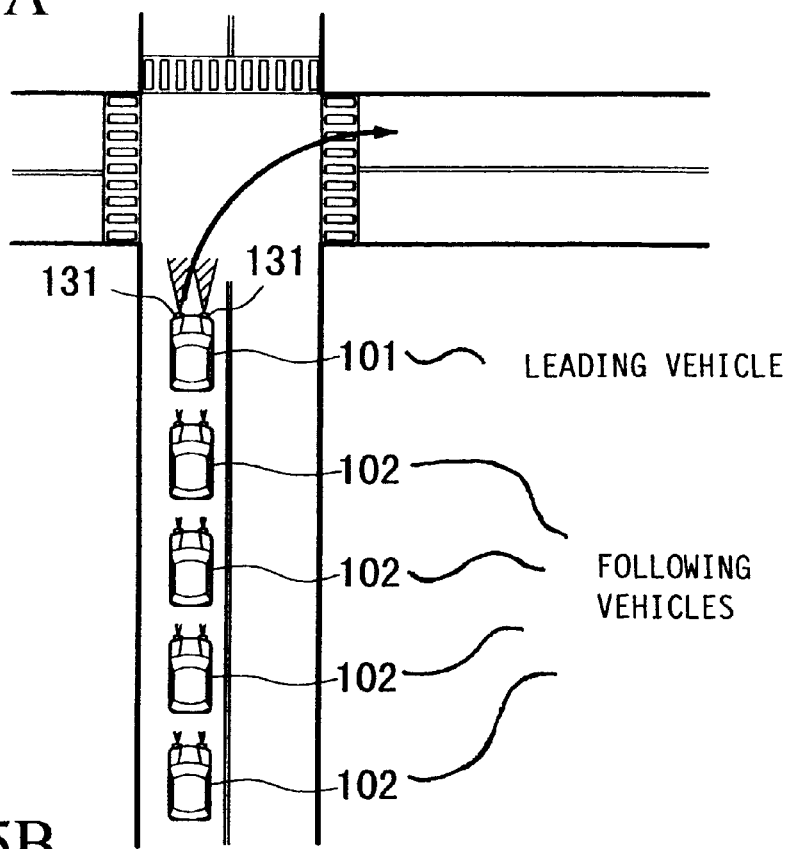
FIGS. 25A and 25B are top views schematically showing the progress of tracking of vehicles using a lighting control apparatus for the automatic following travel system of the eighth embodiment of the present invention.
Figure 25B:
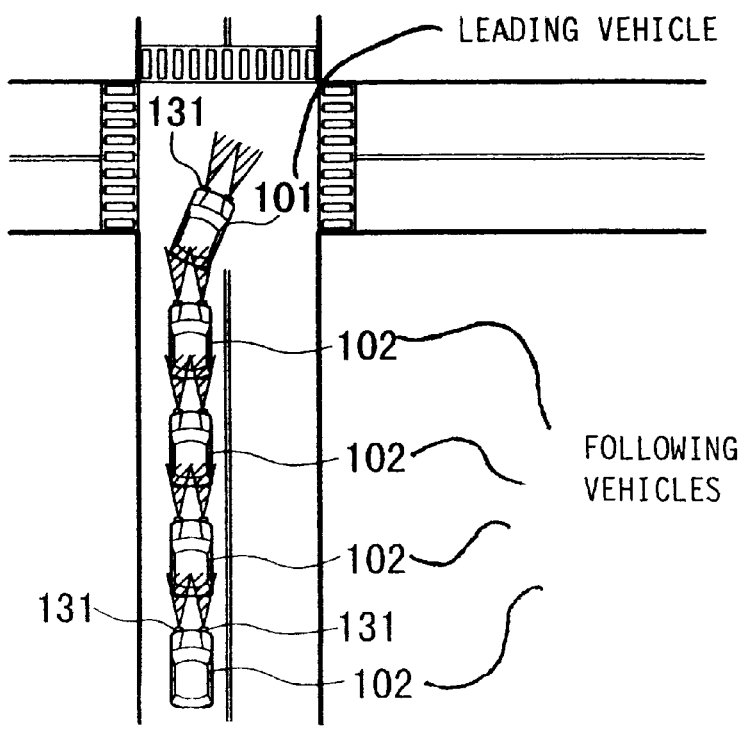
Figure 26:
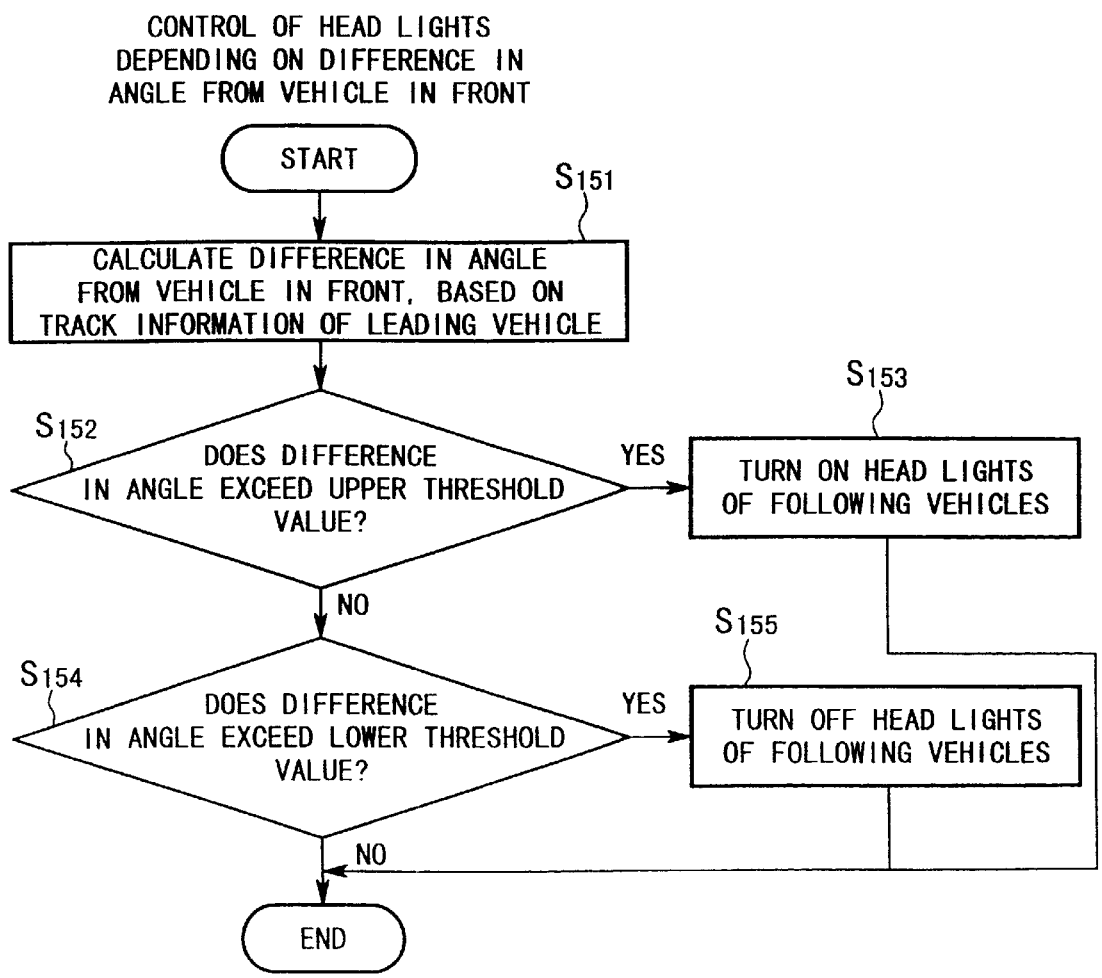
FIG. 26 is a flowchart showing the process of the lighting control apparatus in the automatic following travel system of the eighth embodiment.

FIGS. 25 to 26 show the eighth embodiment of the present invention.

The seventh embodiment turns on the headlights 131 of the following vehicles 102 when the differences in angle between the following vehicles 102 and the vehicle in front exceeds a predetermined value.

When turning right in a crossing, the following vehicles 102 should beforehand turn on the headlights just before the turning, to make pedestrians or drivers in oncoming vehicles aware of the existences of the turning vehicles.

In the eighth embodiment, the following vehicle 102 includes a determining device for determining whether the headlights are to be turned on or off, based on information concerning the condition of the leading vehicle 101 transmitted through the inter-vehicle communicator such as the radio communicator 120. While the headlight switch has been turned on, the eighth embodiment turns on the headlights 131 when the determining device determines that the headlights should be turned on, and turns off the headlights, and turns on positioning lights, when the determining device determines that the headlights should be turned off (see FIG. 25).

A criterion for the determining device may be track data transmitted by the inter-vehicle communication (a driving distance, coordinates, and a GPS measurement result), or information concerning the operation of the turn signal lights. This embodiment uses the track data of the leading vehicle, and more specifically, relative differences in angle between the vehicles and the leading vehicle.

Because this embodiment has a construction similar to the seventh embodiment, the construction will be explained with reference to a flowchart, and a control block diagram is omitted.

The operation of the lighting control apparatus in the automatic following system of the eighth embodiment will now be explained with reference to FIGS. 25 and 26.

When traveling in line, the following vehicles 102 store the travel track of the leading vehicle 101, and trace the track to achieve the travel in line. The following vehicles 102 travel while measuring the differences in angle with respect to the leading vehicle 101 (step S151). Because it is night, the headlight switches have been turned on.

A method for measuring the relative difference in angle between the following vehicle 102 and the leading vehicle 101 may include receiving track data (a driving distance, coordinates, and a GPS measurement result) of the vehicle in front via the radio communicator 120, and calculating the angle from the relationship between positions of the leading vehicle 101 and the following vehicle 102.

The following vehicles 102 detects that the leading vehicle 101 starts turning right, and turns on its headlights 131 when the amount of the turning (the difference in angle between the vehicles, or the degree of the turning) requires turning on the headlights 131.

Specifically, when the leading vehicle 101 enters a crossing as shown in FIG. 25A, the leading vehicle 101 has turned on the headlights 131, and the following vehicles 102 have turned on the positioning lights. When the leading vehicle 101 starts turning right in the crossing, each of the following vehicles 102 determines whether the difference in angle from the leading vehicle 101 exceeds the predetermined upper threshold value (step S152). When it exceeds the value, the following vehicle 102 turns on the headlights (step S153) as shown in FIG. 24B.

When the right turn is completed so that the difference in angle between the leading vehicle 101 and the following vehicle 102 becomes equal to or below the predetermined upper threshold value, it is determined whether the difference in angle is equal to or below a predetermined lower threshold value (step S154). When the difference in angle becomes equal to or below the lower threshold value, the following vehicle 102 turns off its headlights 131 (step S155), and turns on its positioning lights. When the difference in angle exceeds the lower threshold value, the headlights are not turned off, and are kept on.

When turning right in the crossing, the following vehicle 102 turns on its headlights beforehand just before the turning, which makes a driver in an oncoming vehicle aware of the existence of the following vehicle 102.

As described in the seventh embodiment, the upper and lower threshold values are defined so that the light from the headlights 131 of the following vehicle 102 reach not only the vehicle in front but also the side of the vehicle in front. For example, the upper threshold value may be 35 degrees, and then the lower threshold value is 20 degrees.

[Ninth Embodiment]

Figure 27:
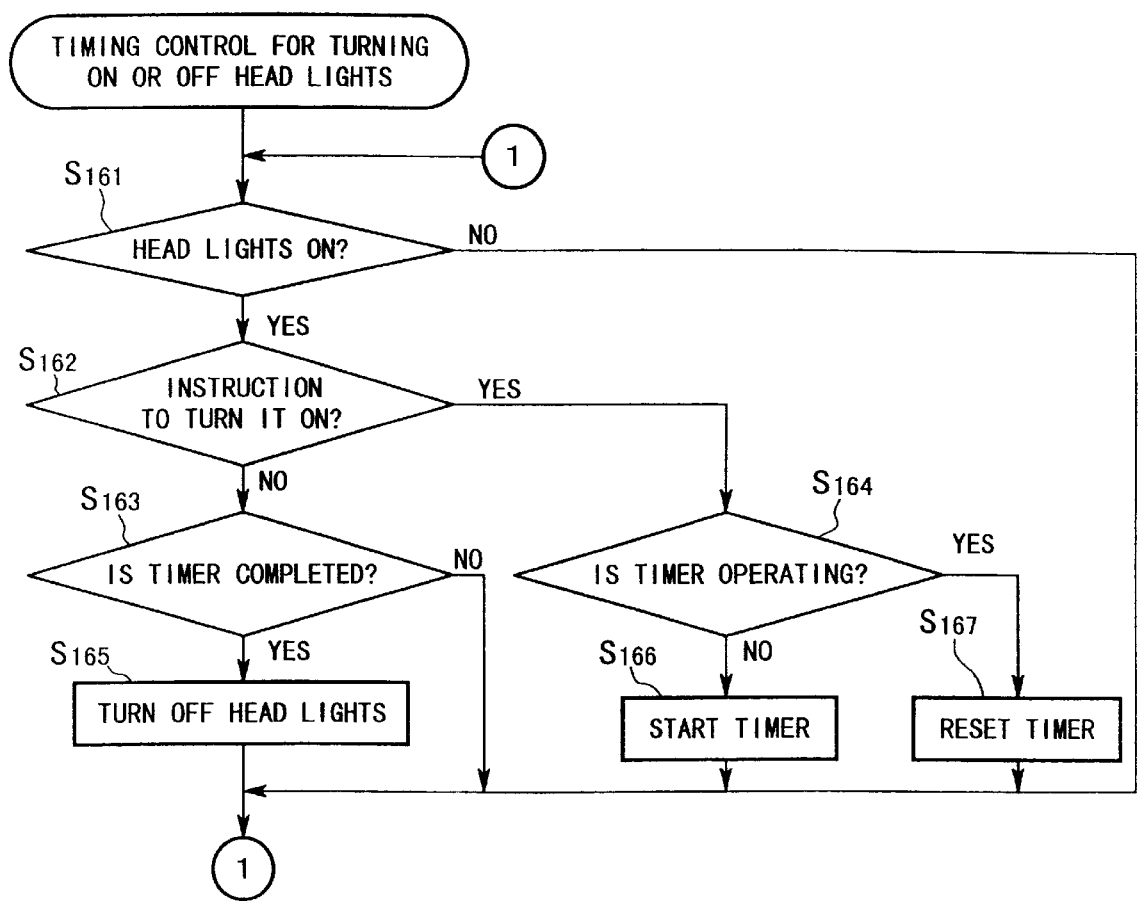
FIG. 27 is a flowchart showing the process of the lighting control apparatus in the automatic following travel system of the ninth embodiment.

FIG. 27 shows the ninth embodiment of the present invention.

The sixth to eighth embodiments may frequently repeat turning on and off the headlights when the vehicles traveling in line frequently turn right and left, or when the intervals between the vehicles frequently change. This repetition shortens the lives of the headlights.

In the ninth embodiment, once the headlights has been turned on, they are not turned off for a while, thereby reducing the frequency of turning on and off the headlights.

The headlights are turned off, based on a time, or a driving distance. This embodiment uses a time reference to turn off the headlights.

The following vehicle includes a lighting maintaining device for maintain the lighting of the headlights for a predetermined period of time after the following vehicle is instructed to turn on the headlights.

Because this embodiment has a construction similar to the seventh embodiment, the construction will be explained with reference to the flowchart of FIG. 16, and a control block diagram is omitted.

The operation of the lighting control apparatus in the automatic following system of the ninth embodiment will now be explained.

First, it is determined whether the headlights have been turned on or not (step S161). When the headlights have been turned on, the flow proceeds to step S162. When the headlights have been turned off, it is again determined, after a predetermined period of time, whether the headlights have been turned on or not.

In step S162, it is determined whether an instruction to turn on the lights has been issued. When an instruction has been issued, it is determined whether a timer is being operated or not (step S164). This timer is to determine the timing to turn off the headlights.

When in step S162 an instruction to turn on the headlights has been issued, it is determined whether the timer has completed. When the timer has completed, the headlights are turned off. When the timer has not been completed, the headlights are kept on.

That is, whenever there is an instruction to turn on the headlights, the timer is reset, and the headlights are kept on until the timer times the predetermined period of time.

Thus, once the headlights are turned on, they are kept on until the timer has been completed, thereby reducing the frequency of turning on and off the headlights.

The predetermined period of time is defined in consideration of the effect of preventing the shortening of the lives of the headlights, and is, e.g., 5 to 10 seconds.

While the embodiments keeps the headlights on using the time reference, the present invention is not limited to this. A driving distance may be used as the reference, and the headlights may be kept on until the vehicle has traveled by a predetermined distance from the reception of the instruction to turn on the headlights. Further, the instruction to turn off the headlights may be issued, using both the distance reference and the time reference. The predetermined distance is defined in consideration of the effect of preventing the shortening of the lives of the headlights, and is, e.g., 50 to 100 meters.

The present embodiments are to be considered in all respects illustrative and not limiting, and this invention may be embodied in other forms or carried out in other ways without departing from the spirit thereof.

For example, while the embodiments are described by way of the case in which at the crossing the headlights of the unmanned following vehicles traveling in line are turned on or off, corresponding to the on-off actions of the manned leading vehicle, this invention can be applied when the vehicles change a lane.

What is claimed is:

1. A lighting control apparatus for an automatic following travel system in which a leading vehicle is operated by an operator, and at least one following vehicle automatically follows said leading vehicle, wherein
said leading vehicle comprises:
a light operating device for turning on or off a light of said leading vehicle; and
a transmitter for transmitting information indicating the operation of said light operating device, and
said following vehicle comprises:
a receiver for receiving the information from said transmitter; and
a light operating device for producing an operation signal for turning on or off a light of said following vehicle, based on the information received by said receiver;
said transmitter and said receiver function under all automatic following traveling conditions of said leading and following vehicles.

2. A lighting control apparatus according to claim 1, wherein said light is a turn signal light, and said light operating device is a turn signal operating device.

3. A lighting control apparatus according to claim 1, wherein said light is a headlight, and said light operating device is a headlight operating device.

4. A lighting control apparatus according to claim 1, wherein said light is a positioning light, and said light operating device is a positioning light operating device.

5. A lighting control apparatus according to claim 1, wherein said light is a hazard light, and said light operating device is a hazard light operating device.

6. A lighting control apparatus according to claim 1, wherein said light is a stop light, and said light operating device is a stop light operating device.

7. A lighting control apparatus for an automatic following travel system in which a leading vehicle is operated by an operator, and at least one following vehicle automatically follows said leading vehicle, wherein
said leading vehicle comprises:
a light operating device for turning on or off a light of said leading vehicle; and
a transmitter for transmitting information indicating the operation of said light operating device, and
said following vehicle comprises:
a receiver for receiving the information from said transmitter; and
a light operating device for producing an operation signal for turning on or off a light of said following vehicle, based on the information received by said receiver;
said light of said following vehicle is a turn signal light, and said light operating device of said following vehicle is a turn signal operating device; and
said turn signal operating device of said following vehicle produces an operation signal for turning off said turn signal light, only when receiving via said receiver information indicating that said turn signal light of said leading vehicle has been turned off and when said following vehicle has finished turning and starts driving straight.

8. A lighting control apparatus for an automatic following travel system in which a leading vehicle is operated by an operator, and at least one following vehicle automatically follows said leading vehicle, wherein
said leading vehicle comprises:
a light operating device for turning on or off a light of said leading vehicle; and
a transmitter for transmitting information indicating the operation of said light operating device, and
said following vehicle comprises:
a receiver for receiving the information from said transmitter; and
a light operating device for producing an operation signal for turning on or off a light of said following vehicle, based on the information received by said receiver;
said light of said following vehicle is a turn signal light, and said light operating device of said following vehicle is a turn signal operating device; and
said turn signal operating device of said following vehicle produces an operation signal for turning on or off said turn signal light, only when receiving via said receiver information indicating that said turn signal light of said leading vehicle has been turned on or off and when said following vehicle reaches a point that said leading vehicle passed at the time of reception of the information.

9. A lighting control apparatus for an automatic following travel system in which a leading vehicle is operated by an operator, and at least one following vehicle automatically follows said leading vehicle, wherein
said leading vehicle comprises:
a light operating device for turning on or off a light of said leading vehicle; and
a transmitter for transmitting information indicating the operation of said light operating device, and
said following vehicle comprises:
a receiver for receiving the information from said transmitter; and
a light operating device for producing an operation signal for turning on or off a light of said following vehicle, based on the information received by said receiver;
said light of said following vehicle is a turn signal light, and said light operating device of said following vehicle is a turn signal operating device;
said transmitter of said leading vehicle transmits position information indicating a location where said leading vehicle turns on or off said turn signal light,
said receiver of said following vehicle receives the position information, and
said turn signal operating device of said following vehicle produces an operation signal for turning on or off said turn signal light, only when receiving via said receiver information indicating that said turn signal light of said leading vehicle has been turned on or off and when said following vehicle reaches the location where said leading vehicle turned on or off said turn signal light.

10. A lighting control apparatus for an automatic following travel system in which a leading vehicle is operated by an operator, and at least one following vehicle automatically follows said leading vehicle, wherein:

said following vehicle comprises:

relative position sensor for calculating information indicating the relationship between the positions of said following vehicle and a vehicle in front, which may be said leading vehicle or another following vehicle; and light operating device for turning on a light when the value measured by said sensor exceeds a first predetermined value while a light switch has been turned on, and for turning off said light when the value measured by said sensor is equal to or below a second predetermined value even while said light switch has been turned on.

11. A lighting control apparatus according to any claim 10, wherein said light is a headlight, and said light operating device is a headlight operating device.

12. A lighting control apparatus according to claim 10, wherein said sensor is a distance sensor for measuring the distance between said following vehicle and said vehicle in front.

13. A lighting control apparatus according to claim 10, wherein said sensor is an angle difference sensor for measuring the difference in angle between said following vehicle and said vehicle in front.

14. A lighting control apparatus according to claim 10, wherein said sensor is a lateral deviation sensor for measuring the lateral deviation between said following vehicle and said vehicle in front.

15. A lighting control apparatus according to claim 10, wherein said following vehicle further comprises an on-state maintaining device for keeping said light on after turning on said light until a predetermined time has passed or until said following vehicle travels a predetermined distance.

16. A lighting control apparatus for an automatic following travel system in which a leading vehicle is operated by an operator, and at least one following vehicle automatically follows said leading vehicle, wherein:

said following vehicle comprises a determining device for determining whether said light is to be turned on or off, based on information concerning the condition of said leading vehicle transmitted via inter-vehicle communication, when said determining device determines that said light is to be turned on while a light switch has been turned on, said light is turned on, and when said determining device determines that said light is to be turned off even while the light switch has been turned on, said light is turned off.

* * * * *

UNITED STATES PATENT AND TRADEMARK OFFICE
CERTIFICATE OF CORRECTION

PATENT NO. : 6,356,189 B1
DATED : March 12, 2002
INVENTOR(S) : Tomo Fujimaki

It is certified that error appears in the above-identified patent and that said Letters Patent is hereby corrected as shown below:

Title page,
Item [57], ABSTRACT,
Line 1, change "In the lighting control apparatus, according to the present" to
-- A lighting control apparatus --;
Line 2, delete "invention,"; and
Line 4, after the comma insert -- wherein --.

Column 1,
Lines 15-16, delete ",the contents of which are incorporated herein by reference".
Line 35, change "flashes" to -- flash --.

Column 2,
Line 5, change "a short distances" to -- short distances --.
Line numbered between 30 and 31, change "of present" to -- of the present --.
Line 66, after "device" insert -- of the following vehicle --.

Column 3,
Line numbered between 28 and 29, after "device" insert -- of the following vehicle --.
Line numbered between 36 and 37, change "is turning" to -- have not yet turned --.
Line numbered between 38 and 39, after "light" insert -- of the following vehicle --;
before "turned" insert -- not --.
Line numbered between 41 and 42, delete "not".
Line 45, after "device" insert -- of the following vehicle --.
Line 51, after ")" insert a period.

Column 4,
Line 2, after "indicating" insert -- a position --.
Line 5, after "device" insert -- of the following vehicle --.
Line 9, after "reaches" insert -- the location --.
Line 11, after "steps" insert -- S34 - S37 and S41 - S44 --.
Line numbered between 35 and 36, before "calculating" insert -- sensing or --.
Line numbered between 37 and 38, after "front" insert -- thereof --.
Line 53, change "even while" to -- independent of whether --.
Line 56, change "which" to -- according to the invention --.

UNITED STATES PATENT AND TRADEMARK OFFICE
CERTIFICATE OF CORRECTION

PATENT NO. : 6,356,189 B1
DATED : March 12, 2002
INVENTOR(S) : Tomo Fujimaki

It is certified that error appears in the above-identified patent and that said Letters Patent is hereby corrected as shown below:

Column 5,
Line 6, after "front" insert -- thereof --.
Line 25, after "front" insert -- thereof --.
Line 44, after "front" insert -- thereof --.
Line 60, change "the" to -- a --.

Column 6,
Line 7, after "leading" insert -- vehicle --.
Line numbered between 20 and 21, change "tuning" to -- turning --.

Column 8,
Line 11, change "and the" to -- and of the --.
Line 21, after "steering" insert -- action --.

Column 9,
Line 45, change "produce" to -- produces --.

Column 10
Line 33, change "is" to -- are --.
Line 47, change "has been" to -- have been --.
Line 52, after "sent:" insert -- i.e., --.
Line 59, change "has" to -- have --.

Column 11,
Line 58, change "turns them" to -- turn them --.
Line 59, change "has" to -- have --.
Line 62, change "embodiment" to -- embodiments --.

Column 12,
Line 13, change "lights" to -- light --.
Line 45, change "produce" to -- produces --.

Column 13,
Line 54, change "10 and 11" to -- 9 and 10 --.

UNITED STATES PATENT AND TRADEMARK OFFICE
CERTIFICATE OF CORRECTION

PATENT NO. : 6,356,189 B1
DATED : March 12, 2002
INVENTOR(S) : Tomo Fujimaki

It is certified that error appears in the above-identified patent and that said Letters Patent is hereby corrected as shown below:

Column 14,
Line 25, change "produce" to -- produces --.
Line 66, change "has" to -- have --.

Column 15,
Line 25, change "the vehicle" to -- the vehicles --.

Column 17,
Line 31, change "vehicle travels" to -- vehicles travel --.
Line 35, change "vehicle" to -- vehicles --.
Line 41, change "33" to -- 133 --.

Column 18,
Line 5, change "uses" to -- use --.
Line 33, change "measure" to. -- measured --.
Line 48, change "6A and 6C" to -- 18A and 18C --.
Line 54, change "of" to -- off --.
Line 62, change the comma to a period.

Column 19,
Line 11, change "a angle" to -- an angle --.
Line 16, change "22" to -- 23 --.
Line 46, change "22" to -- 23 --.

Column 20,
Line 39, after "aware" insert -- of --.
Line 55, change "with respect of" to -- with respect to --.
Line 58, delete "[Eighth".
Line 59, before "Embodiment]" insert -- [Eighth --.

Column 21,
Line 42, change "vehicles" to -- vehicle --.

Column 22,
Line 19, change "has" to -- have --.
Line 26, change "maintain" to -- maintaining --.
Line 31, change "16" to -- 27 --.
Line 61, change "embodiments keeps" to -- embodiments keep --.

UNITED STATES PATENT AND TRADEMARK OFFICE
CERTIFICATE OF CORRECTION

PATENT NO. : 6,356,189 B1
DATED : March 12, 2002
INVENTOR(S) : Tomo Fujimaki

It is certified that error appears in the above-identified patent and that said Letters Patent is hereby corrected as shown below:

Column 23,
Line numbered between 34 and 35, after "wherein said light" insert -- of said following vehicle --.
Line numbered between 35 and 36, change "device is" to -- device of said following vehicle is --.
Line numbered between 37 and 38, change "light is" to -- light of said following vehicle is --.
Line numbered between 38 and 39, change "device is" to -- device of said following vehicle is --.
Line numbered between 40 and 41, change "light is" to -- light of said following vehicle is --.
Line numbered between 41 and 42, change "device is" to -- device of said following vehicle is --.
Line numbered between 43 and 44, change "light is" to -- light of said following vehicle is --.
Line numbered between 44 and 45, change "device is" to -- device of said following vehicle is --.
Line numbered between 46 and 47, change "light is" to -- light of said following vehicle is --.
Line numbered between 47 and 48, change "device is" to -- device of said following vehicle is --.

Column 25,
Line 4, after "wherein" delete the colon.
Line 6, before "relative" insert -- a --.
Line 7, change "the relationship" to -- a relationship --; change "the positions" to -- positions --.
Line 8, before the comma insert -- thereof --.
Line 9, after "another" insert -- said --.
Line numbered between 10 and 11, before "light operating" insert -- a --; change "the" to -- a --.
Line numbered between 15 and 16, change "even while" to -- independent of whether --.
Line numbered between 17 and 18, delete "any".
Line numbered between 21 and 22, delete "the".
Line numbered between 23 and 24, before the period insert -- thereof --.
Line numbered between 26 and 27, change "the difference" to -- a difference --.
Last line in the column before the period insert -- thereof --.

UNITED STATES PATENT AND TRADEMARK OFFICE
CERTIFICATE OF CORRECTION

PATENT NO. : 6,356,189 B1
DATED : March 12, 2002
INVENTOR(S) : Tomo Fujimaki

It is certified that error appears in the above-identified patent and that said Letters Patent is hereby corrected as shown below:

<u>Column 26,</u>
Line 3, change "the" to -- a --.
Line 4, before the period insert -- thereof -- .
Line 16, change "said light" to -- alight --.
After the last line in the column, insert the following omitted claim:
-- 17. A lighting control apparatus according to claim 16, wherein said following vehicle includes said light and said leading vehicle includes said light switch. --.

Signed and Sealed this

Twenty-third Day of September, 2003

JAMES E. ROGAN
*Director of the United States Patent and Trademark Office*